(12) United States Patent
Mestchian

(10) Patent No.: US 11,048,487 B1
(45) Date of Patent: Jun. 29, 2021

(54) SYNTACTICAL CHANGE-RESISTANT CODE GENERATION

(71) Applicant: The MathWorks, Inc., Natick, MA (US)

(72) Inventor: Ebrahim M. Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/728,993

(22) Filed: Dec. 27, 2019

(51) Int. Cl.
G06F 9/44 (2018.01)
G06F 8/41 (2018.01)
G06F 8/72 (2018.01)
G06F 8/75 (2018.01)
G06F 8/76 (2018.01)

(52) U.S. Cl.
CPC ............ G06F 8/42 (2013.01); G06F 8/433 (2013.01); G06F 8/72 (2013.01); G06F 8/75 (2013.01); G06F 8/76 (2013.01)

(58) Field of Classification Search
None
See application file for complete search history.

(56) References Cited

U.S. PATENT DOCUMENTS 8,239,836 B1 * 8/2012 Franz ............... G06F 11/1487
717/127
9,311,077 B2 * 4/2016 Klinger ................ G06F 8/71
2003/0066051 A1 * 4/2003 Karr ..................... G06F 8/31
717/114
2006/0059473 A1 3/2006 Moler
2008/0127057 A1 * 5/2008 Costa .................... G06F 8/34
717/106
2012/0304153 A1 * 11/2012 Li .......................... G06F 8/75
717/123
2016/0019037 A1 1/2016 Varga

OTHER PUBLICATIONS

Beck, A survey of program slicing for software engineering. NASA Technical Report, Accession No. 95N16574, Report No. NASA-CR-193116. Apr. 5, 1993:1-50.
Lahiri et al., Differential static analysis: opportunities, applications, and challenges. Proceedings of the FSE/SDP Workshop on Future of Software Engineering Research. Nov. 7, 2010:201-4.

(Continued)

Primary Examiner — Qamrun Nahar
(74) Attorney, Agent, or Firm — Wolf, Greenfield & Sacks, P.C.

(57) ABSTRACT

Systems and methods for syntactical change-resistant code generation are described. A code generator can generate syntactical change-resistant code from original code and new code, where the new code may be intended as a replacement or update for the original code. The code generator can determine, for code portions and/or sub-portions of the new code, whether or not semantic, syntactic, and structural differences from the original code exist. The code generator can generate the syntactical change-resistant code to leverage and include in the syntactical change-resistant code portions and sub-portions of the original code that have been used and tested, so as to improve reliability of the syntactical change-resistant code.

23 Claims, 11 Drawing Sheets

(56) References Cited

OTHER PUBLICATIONS

Nelson et al., Static differential program analysis for software-defined networks. International Symposium on Formal Methods Jun. 24, 2015:395-413.
Partush et al., Abstract semantic differencing via speculative correlation. Proceedings of the 2014 ACM International Conference on Object Oriented Programming Systems Languages & Applications (OOPSLA'14). Oct. 15, 2014:811-28.
Raghavan et al., Dex: a semantic-graph differencing tool for studying changes in large code bases. Proceedings of the 20th IEEE International Conference on Software Maintenance, 2004 (ICSM'04). Sep. 11, 2004:188-97.
Sherveghar, C++ Function Overloding: Part 1—Three steps of overload resolution. Blogspot. http://deepaksherveghar.blogspot.com/2011/09/c-function-overloding-part-1-three.html, Sep. 10, 2011, 3 pages.
Silva, A vocabulary of program slicing-based techniques. ACM Computing Surveys (CSUR). Jun. 14, 2012;44(3):1-41.

* cited by examiner

|  $C_O$  |  $C_N$  |  $C_{CR}$  |
| --- | --- | --- |
| Original Code 110 | New Code 120 | Change-Resistant Code 130 |
| ....<br>if ((u>12.5) && (u<24.0))<br>  y = b+a+c;<br>else {<br>  double v;<br>  v = sin(u);<br>  y = v\*v;<br>....<br><br>z = f(y) | ....<br>if ((u<=12.5) \|\| (u>=24.0) {<br>  register double r = cos(u);<br>  y = r\*r;<br>} else<br>  y = c+b+a;<br>....<br><br>z = f(y) | ....<br>if ((u>12.5) && (u<24.0))<br>  y = b+a+c;<br>else {<br>  double v;<br>  /\*\*\*\*\*\*\*\*\*\*\*\*\*\*\*\*\*<br>  \* removed patch 3.46<br>  \* v = sin(u);<br>  \*/<br>  /\* added patch 3.46 \*/<br>  v = cos(u);<br>  /\*\*\*\*\*\*\*\*\*\*\*\*\*\*\*\*\*/<br>  y=v\*v;<br>}<br>....<br>z = f(y) |

FIG. 5A

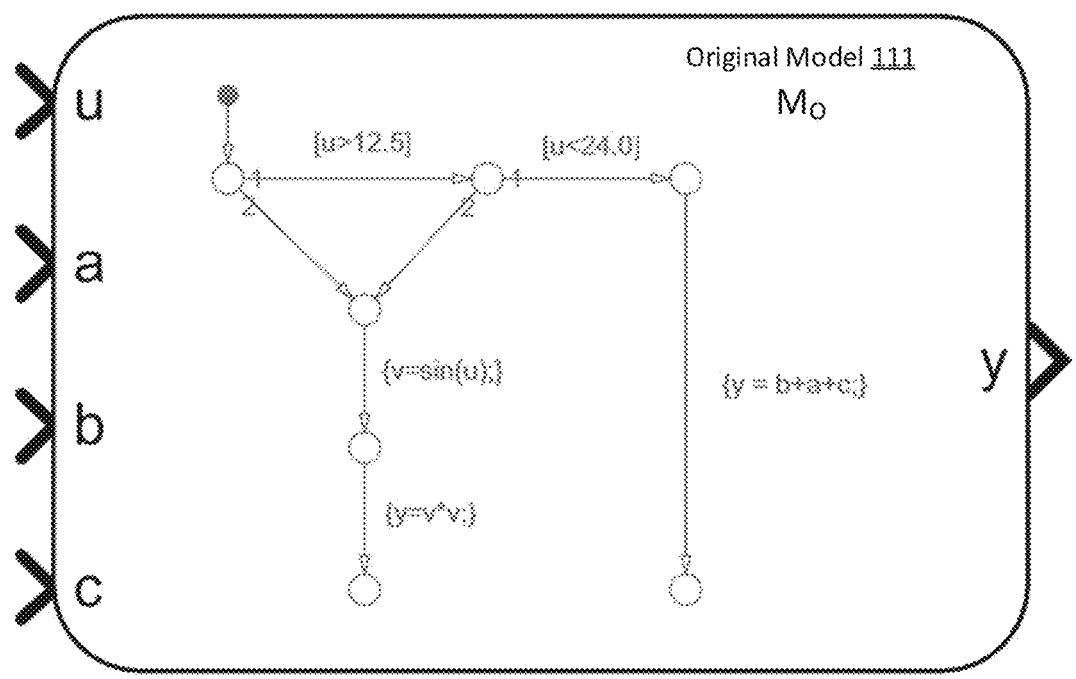

FIG. 5B path 1 path 2 path 3

SYNTACTICAL CHANGE-RESISTANT CODE GENERATION

SUMMARY

The disclosed embodiments relate to systems and methods for syntactical change-resistant code generation. In overview, syntactical change-resistant code generation is a method of producing serviceable code (referred to as "syntactical change-resistant code") that will be placed in service to replace original, existing, or old code, and for which non-semantic differences are minimized and the structure and syntax of the original code are preserved in the syntactical change-resistant code to the extent possible. As used herein, the phrase "original code" is used to reference original, existing, or old code which may have been placed in service or otherwise used and/or tested prior to generation of syntactical change-resistant code. The phrases "replacement code," "new code" and "updated code" are used interchangeably to refer to new code that may be produced in conventional ways and intended as replacement code for the original code.

At a further level of detail, syntactical change-resistant code generation can provide novel, automated code generation that takes into account one or more previous version(s) or release(s) of original code and/or original model in order to minimize non-semantic differences (e.g., syntax, structure) in the syntactical change-resistant code. To this end non-semantic change detection (i.e., identifying the semantically equivalent parts of original code and new code that may include syntactic or structural differences) and syntactic change-avoidance (also referred to as syntactic change-reluctance) may be employed in a change-resistant code generator, and in some cases may be retrofitted into existing code-generation schemes (e.g., as additional transformation stages during code synthesis). In some implementations, non-semantic change detection and syntactic change-avoidance can be embodied in an independent coding tool that can receive and process output from an existing code generator. An aspect of semantically aware, syntactic change-reluctant code generation is to preserve as much of the structure and syntax of the original code in the syntactical change-resistant code while keeping the semantic equivalence of the intentional changes made to the original code.

The phrases "syntactical change-resistant code generation," "semantically-aware, syntactic change-reluctant code generation," "code generation with reluctance towards non-semantic changes," and "semantically-equivalent, syntactically-preserving code generation," may be used interchangeably to refer to the same process of code generation. A "model" can be embodied as a functional specification, or code base (textual and/or graphical), that represents behavior of a complex system.

The terms "code," "program," "code," "computer code," and/or "programming code," as used herein, are to be used interchangeably and are to be broadly interpreted to include textual code, graphical code, mixed textual and graphical code, intermediate representation generated from textual code and/or graphical code, or any combination of the same. Textual code can include text-based code that may require further processing to execute (e.g., Ada, Basic, JAVA, C, C++, C#, FORTRAN, or assembly language code; Hardware Description Language (HDL) code, very-high-speed integrated circuits (VHSIC) HDL (VHDL) code, VERILOG, System C and/or other types of hardware or software based code that may be compiled and/or synthesized); binary code that may be executed (e.g., executable files that may directly be executed by an operating system, bit-stream files that can be used to configure a field-programmable gate array (FPGA), JAVA byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, textual code may include different combinations of the above-identified classes (e.g., text-based code, binary code, text files, etc.). Alternatively, or additionally, textual code may include code in a programming language that supports dynamic typing (e.g., the M language, a MATLAB® language, a MATLAB-compatible language, a MATLAB-like language, *Julia*, etc.) that can be used to express problems and/or solutions in mathematical notations. In some cases, textual code can include graphical code (e.g., MATLAB containing UI elements, Stateflow elements, or Jupyter related products). Graphical code can be implemented as pictorial symbols that may be interconnected and rendered on a visual display, such as circuit elements used in Simulink®, for example. Graphical code may include models built connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail. Graphical code may be directly converted into textual code executable in a target environment. For example, graphical code can include a model of a control system for an automobile, which may be implemented in textual code deployed in an embedded system in the automobile. Environments for generating example graphical code include Simulink®, Stateflow®, SimEvents™, etc., by The MathWorks, Inc.; VisSim by Visual Solutions: LabView® by National Instruments; Dymola by Dynasim: SoftWIRE by Measurement Computing: WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence: Rational Rose from IBM; Rhpsody or Tau from Telelogic; Ptolemy from the University of California at Berkeley; Agilent VEE by Agilent Technologies; Advanced Design System (ADS) by Agilent Technologies; SCADE Suite® by ANSYS, Inc; Agilent Ptolemy by Agilent Technologies; ASCET, CoWare, or aspects of a Unified Modeling Language (UML) or SysML environment. In some cases, graphical code can include textual code (e.g., graphical model with blocks that are FMUs or S-functions).

In some implementations, textual code and/or graphical code and/or executable code may be automatically generated in whole or in part by a code generator from one or more of a variety of code "sources" which include, but are not limited to: one or more models (e.g., Simulink® or Stateflow® model(s) or any of the above-mentioned models), one or more graphical codes, a modeling language (e.g., unified modeling language—UML), informal or formal textual requirement documents or functional specifications that may specify the behavior and/or functions of a system, etc. According to some embodiments, textual code may be produced manually with text-based coding tools (e.g., Matlab®, etc.) or coded directly into a conventional programming language such as C, C++, Fortran, etc.

The term "intermediate representation" refers generally to a type of code containing information between source code and target code that is derived from the source code and may include additional information not present in the source code. Intermediate representation is used to generate target code by a code generator. In some embodiments, intermediate representation may include portions of code that are readily recognizable to a human programmer, e.g., resemble a known programming language such as C or C++ or other language. In some implementations, intermediate representation may include portions in lower level machine language or binary. In some embodiments, intermediate representation may be stored temporarily in a data storage medium during generation of target code. The target code may be a recognizable programming language such as C or C++ or other language, or a combination of languages.

According to some embodiments, syntactical change-resistant code generation may be performed by a patch-code generator. The patch-code generator can use, for example, field-tested, original code and/or original model along with new code and/or a new model as inputs from which syntactical change-resistant code can be generated as an output from the patch-code generator. The new code, or new code generated from a new model, may be produced in conventional ways and intended as replacement or updated code for the original code and may include a majority of functionality present in the original code. The new code may add and/or remove functionality from the original code. The generated syntactical change-resistant code can contain fewer syntactical and/or structural differences from the original code, as compared to the number of syntactical and/or structural differences between the new code and the original code. In some situations, the syntactical change-resistant code can be substantially the same syntactically and structurally to the original code. For example, between 50% and 95%, or approximately those end values, of the syntactical change-resistant code may be identical to the portions of the original code. In some cases, between 70% and 95%, or approximately those end values, of the syntactical change-resistant code may be identical to portions of the original code. In some cases, between 80% and 95%, or approximately those end values, of the syntactical change-resistant code may be identical to portions of the original code. In some cases, between 90% and 95%, or approximately those end values, of the syntactical change-resistant code may be identical to portions of the original code.

When executed, the syntactical change-resistant code can perform the same or essentially the same functionalities present in the new code. However, the syntactical change-resistant code may include a majority of syntax and structure from the original code (e.g., taking advantage of and including features from the field-tested original code). Accordingly, the disclosed embodiments can leverage the original code to improve the quality and reliability of the syntactical change-resistant code and reduce risks that would otherwise be associated with the new code, e.g., in terms of quality and reliability. In this regard, an intrinsic value associated with the original code stems primarily from two areas: effort-based, and time-based. Effort-based value is derived from testing and verification effort that has already gone into qualifying the original code. Time-based value comes from reliability gained through successful running of the original code in the field for a useful period of time. Such "field-tested" original code, whether in form of programming code running in an embedded system such as an ECU (electronic control unit) of an automobile or other vehicle, in the form of mission-critical application software deployed in the field, or in any other form, can benefit from not only the initial effort of extensive test and verification performed on the original code prior to its deployment, but also in many cases months and years of being used successfully in its intended application. The invaluable assurance associated with extended, time-based reliability evidence of original code under real-world conditions cannot be overstated. Often times, particularly in high-integrity applications, it is extremely difficult to regain that level of assurance with effort-based qualification activities on later generated replacement code for the same hardware.

There are many applications and instances for which new code may be produced as replacement code for systems. Example applications include, but are not limited to, instances in which a code base is deployed on a physical system (automobile, airplane, ship, train, transportation system, windmill, power generation facility, power grid, automated manufacturing equipment or facility, etc.) and needs to be updated. Additional example applications include, but are not limited to, complex computational models of systems (model of a biological systems, weather systems, oceanographic systems, biochemical processes, complex circuits, semiconductor devices, etc.) which may include neural networks or deep neural networks in the models. Additional example applications include, but are not limited to, information processing codes (e.g., signal processing code, image processing code, deep learning code, speech recognition code, network code, etc.). Such code bases may contain thousands, tens of thousands, hundreds of thousands, or even millions of lines of code. In some cases, replacement code may be needed to improve the performance of existing code (e.g., to execute more quickly, to produce a more accurate result, to improve code reliability, to remove or repair a code defect, etc.). In some cases, replacement code may be needed to comply with a change in government or other enforcing agency's regulation (e.g., to decrease harmful emissions, to change power distribution, etc.).

In various aspects, the disclosed embodiments take advantage of original code when auto-generating syntactical change-resistant code. An objective of the invention is to reduce the risks associated with the quality and reliability of the syntactical change-resistant code by using the field-tested, original code as much as possible. To this end, advanced technologies and methodologies are employed to automatically stub-in semantically equivalent code from the original code into the syntactical change-resistant code. In many practical cases, this will create syntactical change-resistant code that is substantially identical to the original, which improves the likelihood of identical numerical and functional behavior between the syntactical change-resistant code and original code outside the intentional semantic changes introduced in the new code or to the source of the new code. Intuitively, a high value of this invention is in improved qualification, reliability and traceability of syntactical change-resistant code, when the syntactical change-resistant code has a high degree of similarity with the original code (e.g., more than 50% identical code or other amounts described above).

The original code may have known reliability and/or performance characteristics. In some embodiments, the original code may have been tested for use in an application or applications. For example, the original code may have been verified and validated as meeting requirements and/or specifications for an application in accordance with a control system, e.g., a safety critical control system. As a further example, the original code may have been verified, validated, and/or certified for use in an embedded control system (e.g., as in automobiles, aircraft, trains, marine vessels, aerospace vehicles or machines, other vehicles, wind turbines, power plants, medical devices, or the like), mission- or safety-critical application software, or other application with similarly stringent reliability and/or performance requirements. As a further non-limiting example, the original code may have been placed in service (e.g., controlling a vehicle) for one or more users and/or used successfully for an application-dependent period of time (e.g., months or years) sufficient to establish the performance and reliability of the original code. It is difficult to regain the same level of assurance of the original code with new code. In some implementations, the syntactical change-resistant code can have a high likelihood of identical numerical and functional behavior as the original code, as compared with the numerical and functional behavior differences between the original code and the new code.

The new code may be suitable for use in the same application or applications in place of the original code, or for use in related applications, e.g., updated applications. For example, the new code may be a replacement for the original code in an application, or an adaptation of the original code for use with a new device or in a new application. The new code may differ in functionality from the original code. For example, the new code may include functionality differences, e.g., functionality not present in the original code, or lack functionality present in the original code. The change in functionality may result from technological improvements, changes in design requirements, changes in customer needs or regulatory mandates, changes in associated hardware or physical devices (or models thereof), or similar causes. The particular cause for differences in functionality between the original code and the new code is not intended to be limiting.

The sources or causes of the semantic, structural, and/or syntactical differences between the new code and the original code can vary. The new code may differ, at least in part, syntactically, structurally, and/or semantically from the original code. In some embodiments, the original code may be generated, e.g., manually or automatically by a code generator, from an original model and/or the new code may be generated from a new model. In some cases, semantic differences between the new code and the original code may result from differences in functionality between the new model and the original model or differences between versions of code generators used to generate code from a same model.

For example, structural and syntactical differences may arise from differences in how the original code and the new code are generated. As an example, a model may be generated in a graphical modeling/simulation environment (e.g., Simulink®, Stateflow®, Dymola, Wolfram SystemModeler, LabVIEW®, or the like). The model may be processed with a code generator to create code. In this example, even when the model remains the same, using a different graphical modeling environment or code generator (e.g., different configurations, preferences, or parameters for the same product; different versions of the same product; different products by different vendors, or the like) may result in syntactically or structurally different code. Thus even when differences in functionality between the new model and the original model are minor or non-existent, differences in structure and syntax may exist between the new code and the original code and in some cases the differences may be substantial.

Differences between the new code and the original code may affect reliability and performance of the new code. Accordingly, the new code may normally require testing for use in an intended application. However, differences between the new code and the original code may affect efforts to test performance and reliability of the new code. Verifying and validating all of the new code may be very expensive or time-consuming when dealing with substantial structural and or numerical differences (e.g., differences arising from changes in how a code generator generates code optimized for execution). In conventional approaches, reliability of the original code, gained through its usage and possibly refinement over time, cannot be readily obtained for the new code.

Extensively testing the performance and reliability of the new code following conventional approaches may be both inefficient and inadequate to gain the reliability of the old code. For example, a substantial portion of testing the new code may be duplicative of testing performed on the original code. Furthermore, testing the new code may be an inadequate replacement for the "field testing" achieved through extended use (e.g., months or years) of the original code under real-world conditions (such as may occur for original code placed in service in a vehicle that has been operating for months or years without problems). Particularly with high-integrity applications, such as embedded control systems or mission-critical application software, substantial effort-based qualification activities may be required to regain confidence lost when changing from the original code to the new code.

The disclosed embodiments may address such technical challenges by using code generation with a reluctance or resistance towards non-semantic changes to create syntactical-change-resistant code from the original code and the new code. This change-resistant code may be substantially equivalent functionally to the new code and substantially equivalent in syntax and structure to the qualified, field-tested, original code (excluding differences corresponding to functional changes between the new code and the original code). The inventors recognize and appreciate that substantially preserving the syntax and structure of the original code may carry forward a significant portion of the intrinsic value of pre-existing qualification and reliability associated with the original code. For example, the change-resistant code may be more likely than the new code to exhibit numerical and functional behavior similar to the original code (apart from any intentional functional changes). Accordingly, the change-resistant code may require less testing than the new code. For example, performance and reliability testing may focus on functionality changes between the original code and the change-resistant code. As an additional example, comparisons between code coverage analysis may be simplified and tracking of changes between the change-resistant code and original code can be improved for the change-resistant code as compared to the new code. In some implementations, a change or semantic difference detected in the change-resistant code can be tracked and/or linked to a change made in a model used to generate the change-resistant code. The difference in the model may be a new model version, a parameter change, a setting change, etc. Such tracking or linking can provide a better understanding of the correspondence between a change-resistant code and model, and provide better confidence in code reliability.

A semantically aware, syntactically change-reluctant code generator or code-generation process can generate the syntactical-change-resistant code using the original code and the new code. The code generation can be implemented as an additional stage in, or as part of, an existing code generator. In some cases, the code generation can be implemented in a distinct tool. Such a code-generation process can automatically identify semantic and non-semantic differences between the original code and the new code. The syntactical-change-resistant code can preserve portions of the original code semantically equivalent to corresponding portions of the new code and include those portions in the syntactical change-resistant code. In some embodiments, the code-generation process can address semantic differences between the original code and the new code by including in the syntactical-change-resistant code: (i) stubbed-out code (deactivated in the change-resistant code) that removes semantics present in the original code but not present the new code, and (ii) stubbed-in code that adds semantics present in the new code but not present in the original code. The code generation process may configure active stubbed-in code portions from the original code to preserve the syntax and structure of the original code portions. Such semantically equivalent, syntactically preserving code generation may create syntactical-change-resistant code that is substantially identical to the original code, with differences reflecting intentional changes in functionality between the original code and the new code. In some cases, a majority of the original code may be included in the syntactical-change-resistant code. In some instances, between 60% and 95% of the syntactical-change-resistant code is identical to original code portions. In some cases, between 70% and 95% of the syntactical-change-resistant code is identical to original code portions. In some cases, between 80% and 95% of the syntactical-change-resistant code is identical to original code portions.

As a further overview to different aspects of the inventive embodiments, the following scenario is considered. At a first time $t_1$, a model (denoted $M_1^X$) was built. The superscript X is used to refer to a version of the model. For example, the model may be built using a version X of a modeling environment such as Simulink®, denoted as $SL^X$. After building the model $M_1^X$, code was generated from the model using a code generator of version X, denoted $EC^X$. The generated code was then qualified and deployed into production and/or service, e.g. as an executable code in an embedded system, or as an application in a software environment. One example of deployment in an embedded system is a car's electronic control unit (ECU). In response to deployment and field testing, the model and/or generated code may be modified initially to satisfy customer requirements or to improve performance until a version of the code is obtained for placing in service over an extended period of time (e.g., more than one month). The version of the model and generated code may be considered as the original model $M_O^X$ and the original code and denoted $C_O^X$.

At a second time $t_2$, the model $M_O^X$ is loaded and subsequently amended in an updated version of the modeling environment (e.g., Simulink version y ($SL^Y$) creating an updated model $M_2^Y$. The model $M_2^Y$ may perform substantially the same functions as the model $M_O^X$, except that certain parts of the model $M_1^Y$ may behave differently than $M_O^X$ due to one or more factors such as (1) $M_2 \neq M_O$ irrespective of versions of X and Y and/or (2) $SL^Y \neq SL^X$ irrespective of any changes to $M_2$ with respect to $M_O$. With regard to the first condition $M_2 \neq M_O$, changes to the original model may occur for a variety of reasons. For example, there may be design changes introduced in $M_2$ (e.g., changes made to a programmed control algorithm); there may be changes made to the value(s) of parameter(s) governing model $M_2$ with respect to $M_O$; there may be changes made to the underlying or supporting libraries used in model $M_2$ with respect to $M_O$; there may be changes made to model configurations settings for $M_2$ with respect to $M_O$; and there may be other types of changes made to $M_2$. With regard to the second condition $SL^Y \neq SL^X$, there may be semantic changes in $SL^Y$ with respect to $SL^Y$ causing changes in behavior of $M_2^Y$ with respect to $M_O^X$, for example.

At or after the second time $t_2$, a code generator of version Y ($EC^Y$) may be used to generate new code $C_N^Y$, with the purpose of replacing original code $C_O^X$ in an embedded system or application, for example. The new code $C_N^Y$ may function differently than $C_O^X$ due to a variety of factors, most notably due to functional changes introduced in $M_2$ with respect to $M_O$ ($M_O \neq M_2$) and/or changes in versions (version X≠version Y) of the modelling environment (SL in this example) or code generator (EC in this example). As an example, functional changes may be introduced in a later version of the modelling environment ($SL^Y$) and/or code generator ($EC^Y$) with respect to the original modelling environment ($SL^X$) and original code generator ($EC^X$). In some implementations, changes may be made to a code generator to add, remove, or alter optimizations, code synthesis stages, and/or coder configuration settings.

Scenarios in which updated code may be needed for a system can happen for numerous real-world applications, such as those described above. For example, a manufacturer of hardware (e.g., an automobile) comprising an embedded controller that executes code may recall the hardware to fix certain hardware problems or to update on-board code used in the existing embedded system. A conventional approach to provide updated code for a case where a new model $M_2^Y$ is prepared may be to generate new code $C_N^Y$ completely as the updated code independently of the original model $M_O^X$ and its corresponding original code $C_O^X$, in effect starting from scratch with the new model $M_2^Y$.

A shortcoming of this approach can include excessive waste and/or cost in requalifying the new code $C_N^Y$. In many systems and applications, at time $t_2$ the original $C_O^X$ has been carefully qualified and may have been shown to be reasonably reliable by the virtue of its extensive use in the field. Generating and deploying new code $C_N^Y$ substantially abandons the qualification efforts spent on original code $C_O^X$ and its field-tested reliability. In many cases, the effort and costs associated with qualification of new code $C_N^Y$ has a direct relationship to its size and complexity. The costs and effort can be prohibitive when dealing with substantial structural and/or numerical differences due to such things as optimization changes related to code generation. One particular problematic shortcoming is unnecessary structural changes in $C_N^Y$ with respect to $C_O^X$ causing traceability difficulties between the two versions of the code, or causing confusion in comparing results of modified condition/decision coverage (MC/DC) analyses.

In contrast to conventional code update approaches, the present embodiments take advantage of original code and/or an original model. Instead of using new code $C_N^Y$ as the replacement code for the original code $C_O^X$, $C_N^Y$ and $C_O^X$ can be used as inputs into, for example, a syntactical change-resistant code generator, version Z (denoted $RC^Z$) that is configured to generate syntactical change-resistant code $C_R^Z$. Semantically, the syntactical change-resistant code $C_R^Z$ is equivalent to the new code $C_N^Y$. However, instead of completely newly generated code as in $C_N^Y$, the syntactical change-resistant code $C_R^Z$ can be comprised of primarily portions of the original $C_O^X$, augmented by code instrumentation to stub-out deprecated functionality in $C_O^X$ that is no longer present in $C_N^Y$ and to stub-in appropriately partitioned, slices of $C_N^Y$ representing new or replaced functionality in $C_N^Y$ that is not in $C_O^X$. Stubbing out of deprecated code portions may be done, for example, by commenting out appropriate parts of $C_O^X$. The process of generating syntactical change-resistant code $C_R^Z$ may be represented symbolically (and irrespective of code versions) as follows $$RC(C_O, C_N) \rightarrow C_R, T \qquad (1)$$

where the superscripts have been omitted to allow for variations in code and code-generator versions and where T represents traceability information. The traceability information may include information about correspondence or association, e.g., semantic correspondence or syntactical correspondence, between code/model portions between different versions. The traceability information can be single direction, e.g., from parts of $C_R$ to parts of $C_O$ and/or $C_N$ and/or corresponding model parts. The traceability information can also be bidirectional, e.g., from parts of $C_R$ to parts of $C_O$ and/or $C_N$ and/or corresponding model parts and from model parts and/or $C_O$ and/or $C_N$ to $C_R$ or other model parts. The traceability information discussed below can have similar features without needing to repeat the description here. Without being bound to a particular theory, EQ. 1 can be interpreted as follows: syntactical change-resistant code generator RC receives as input and processes original code $C_O$ and new code $C_N$ to produce syntactical change-resistant code $C_R$ and traceability information T. Because the syntactical change-resistant code generator RC receives both original code $C_O$ and new code $C_N$, it can be configured to determine and record from where portions of change-resistant $C_R$ originate and/or what portions of original code have been deprecated or replaced. Such traceability information can be provided or made available to a user, in response to a query for example, that is developing, examining, or testing the change-resistant code $C_R$. In some implementations, the traceability information T may extend back to models, $M_O$, $M_N$. In some embodiments, the traceability information may be full (meaning that each portion of change-resistant $C_R$ can be traced back to original code, an original modal, new code, or a new model). In some embodiments, the traceability information may be partial (meaning that not every portion of change-resistant $C_R$ can be traced back to original code, an original modal, new code, or a new model).

The process of generating syntactical change-resistant code $C_R^Z$ is not limited to the aspects indicated in EQ. 1. In some embodiments, model information and/or modeling environment information (denoted ME) can be used by a syntactical change-resistant code generator RC in addition to or as an alternative to original code $C_O$ and/or new code $C_N$. As one example, a new model $M_N$ may be used in addition to new code $C_N$.

$$RC(C_O, C_N, M_N) \rightarrow C_R, T \qquad (2)$$

In another example, new code may not be used as input for the syntactical change-resistant code generator RC. Instead, a new model $M_N$ may be used as input rather than new code $C_N$.

$$RC(C_O, M_N) \rightarrow C_R, T \qquad (3)$$

In some cases, a new model and information about the modeling environment ($ME_N$) used to produce new code can be used as input instead of new code. For example, the modeling environment information can include information about code generation and may further include information about code optimizations.

$$RC(C_O, M_N, ME_N) \rightarrow C_R, T \qquad (4)$$

As another example, an original model and new model $M_N$ may be used in addition to original code $C_O$ and new code $C_N$, and the syntactical change-resistant code generator RC may produce a change-resistant model $M_R$.

$$RC(C_O, M_O, C_N, M_N) \rightarrow C_R, M_R, T \qquad (5)$$

As another example, original and new models only may be used as input to produce a change-resistant model $M_R$ and/or change-resistant code $C_R$.

$$RC(M_O, M_N) \rightarrow C_R, M_R, T \qquad (6)$$

When models are used, a syntactical change-resistant code generator RC may utilize intermediate representation (IR) of code in the process of producing syntactical change-resistant code $C_R$.

An example process for generating syntactical change-resistant code may include several steps. In overview, an example first step for which original code and new code are received as inputs, a syntactical change-resistant code generator may identify syntactical and/or structural differences between new code $C_N$ and original code $C_O$. The differences may be identified by comparing (e.g., using automated text analysis) corresponding portions of the two codes. In some implementations, the portions of code that are identified to be syntactically and structurally equivalent may contain semantic differences. For example, these portions of code may use, e.g., call, semantic different code portions that are contained in the syntactical and/or structural different portions, and effectively perform different functionalities, even though the code portions are syntactically and structurally equivalent.

In a next step, a syntactical change-resistant code generator may review, for example, two corresponding portions $P_{CO}$, $P_{CN}$ of the two codes where syntactical and/or structural differences were found to determine whether there exists semantic differences and/or semantic equivalences within at least sub-portions of the two portions. For the corresponding portions where syntactical and/or structural differences have been found, the semantic differences or equivalences may be determined using techniques such as abstract semantic differencing, semantic-graph differencing, and/or symbolic differencing. In some implementations, the semantic differencing can start with a seed, e.g., a local change or difference between the two versions being differenced and proceed with clustering analysis, e.g., through impact analysis alias analysis, liveness analysis, and/or defuse analysis, etc. Clusters of code can be compared to determine differences. In some implementations, slices can be a form of clusters. As part of determining whether semantic differences exist, a syntactical change-resistant code generator may identify corresponding clusters or slices within the two portions that are directed to similar functionality for comparison. In some implementations, the corresponding portions of syntactically and structurally equivalent code can be used in assisting identifying the corresponding clusters or slices. For example, the same function call to two pieces of syntactically and/or structurally different code may indicate that the two pieces of code are corresponding clusters or slices for semantic differencing analysis. In some implementations, a program cluster or slice may be a portion of a program that can be replaced with a similar portion without adversely affecting program execution. A program cluster or slice may also be identified by data dependencies, data flow, and/or execution paths such as "if" paths or "else" paths, for example. Program clusters or slices may also be identified for sub-portions of the codes for which semantic equivalences were found. For simplicity of description, the term "slice" is used elsewhere, while cluster can be applicable in those parts of the description as well.

For the corresponding portions where syntactical and/or structural differences exist while semantic equivalences have been identified, an analysis is performed, e.g., by the code generator, to generate information about the corresponding portions. For example, the information can include symbol mapping or structural mapping. In some implementations, a symbol map can be generated or information about correspondence between slices and/or their structural differences is generated. In some implementations, additional or alternative analysis can also include analyzing the syntactically and structurally equivalent corresponding code portions for generating information including symbol mapping or structural mapping. As described above, such alternative or additional analysis can be used to identify corresponding structural and/or syntactical different portions for semantic differencing analysis, which may generate the needed information for generating the new code. Examples are shown below.

In a subsequent step, a syntactical change-resistant code generator may stub-in and/or preserve to the extent possible in the syntactical change-resistant code $C_R$ program slices from the original code $C_O$ for which semantic equivalences were found in the new code $C_N$. In other words, the code generator can generate the syntactical change resistant code by including in the generated code, at least some portions or all portions of the original code that is syntactically or structurally different from, and semantically equivalent to, corresponding portions of the new code. The syntactical change-resistant code generator may also stub-in slices from the new code $C_N$ for which semantic differences were found. Stubbing-in may include using the information generated. For example, in the stubbing process, the slices from the new code may be modified symbolically or structurally (e.g., using the symbol map) to conform to the symbols and structures of the old code. In some implementations, the locations at which the slices or modified slices are stubbed can be determined based on the generated information, e.g., structural difference, mapping information, and/or slice correspondence. In some embodiments, the syntactical change-resistant code generator may further stub-out or comment out deprecated slices of the old code $C_O$ which is being replaced by a semantically different slice from the new code $C_N$ or for which no corresponding functionality is found in the new code. In some implementations, the syntactical change-resistant code generator may further stub-in slices from the new code $C_N$ for which no corresponding functionality exists in the old code $C_O$. As explained previously, the stubbing-in process may involve applying the information generated through the analysis of the semantic equivalent and syntactically/structurally different code portions. Although the example process is explained with the explicit steps above, these steps do not have to be separate or independent of each other. For example, the analysis step can be performed during semantic differencing or equivalence determination step. Two or more of the steps can be performed in a different sequence from described above. For example, the preserving step of the old code and the stubbing in the new code can be performed within the same step or with either ahead of the other without affecting the result of the process. Further details and aspects of the inventive embodiments are described below.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 5A provides an example illustration of syntactical change-resistant code generation;

FIG. 5B, FIG. 5C, and FIG. 5D depict example representations of slices in original code, new code, and change-resistant code that are illustrated for explanation purposes only. The information may or may not be displayed to a user or represented in the manner shown in these graphs;

The features and advantages of the present invention will become more apparent from the detailed description set forth below when taken in conjunction with the drawings.

DETAILED DESCRIPTION

The following detailed description refers to the accompanying drawings. The same reference numbers in different drawings may identify the same or similar elements.

System Overview

Figure 1:
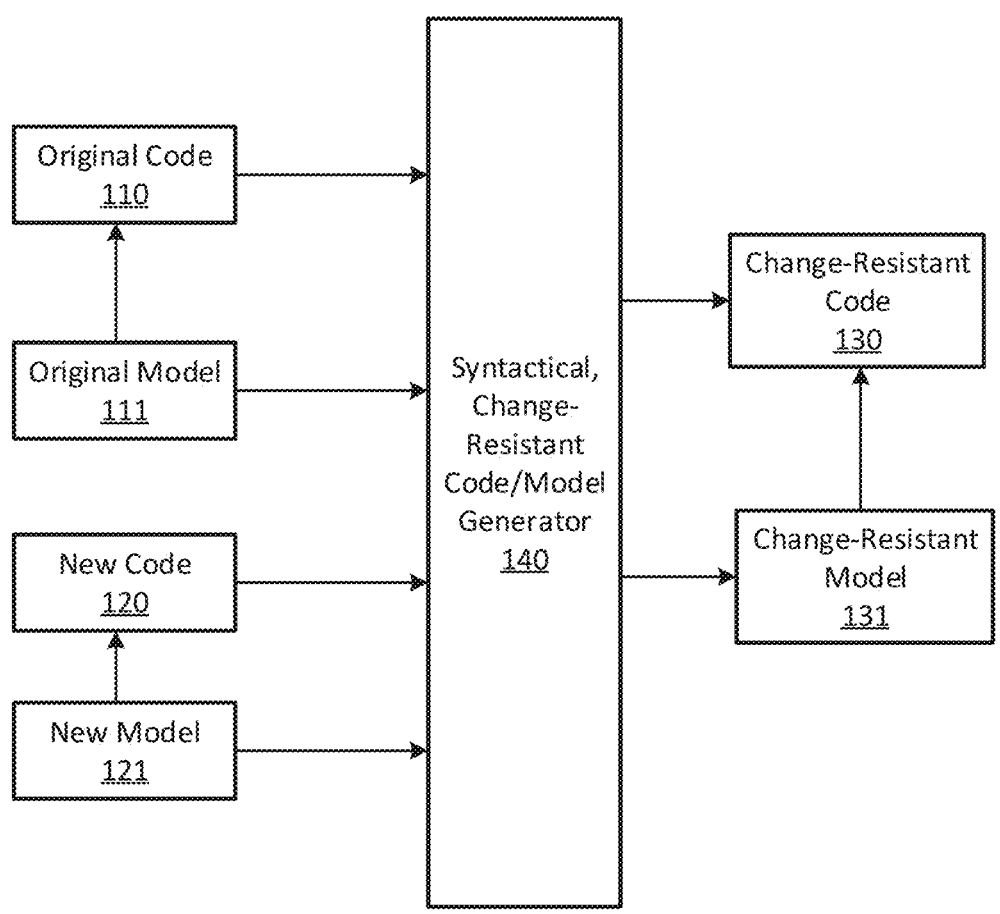
FIG. 1 depicts an example of a system for syntactical change-resistant code generation.

As described above, original code and new code may be semantically similar for a majority of the code, but include structural, syntactic, and/or some semantic dissimilarities. As described above, structural and syntactic differences between original code and new code can arise from how the original code and the new code are generated. As shown in FIG. 1, code generator 140 may use syntactical change-resistant code generation to generate syntactical-change-resistant code 130 and/or change-resistant model 131 from one of, or some combination of, original code 110, original model 111, new code 120, and/or new model 121.

Although FIG. 1 depicts code and models as separate items, in some cases a model can contain textual code along with graphical symbols. According to some embodiments, a model can be produced mainly using graphical symbols according to some modeling languages, of which examples are listed above. A model portion using graphical symbols may be referred to as "graphical code." However, some graphical models may allow for textual code blocks to be included as part of a model that is primarily composed of graphical code. In some implementations, a model may be mainly textual, e.g., based on textual functionality and/or behavior specifications. As described above, original code 110 and new code 120 can be prepared manually or may be generated from an original model 111 and new model 121, as depicted. In some cases, a model may be received by a syntactical-change-resistant code generator 140 along with its corresponding generated code when producing change-resistant code 130. In some implementations as described above, a model only (original or new) may be received and processed by the syntactical-change-resistant code generator 140 along with comparison code (new or original) to generate change-resistant code 130.

Code generator 140 can be implemented in hardware, software, or a combination of hardware and software, consistent with disclosed embodiments. Code generator 140 can be part of a technical computing or simulation environment supporting modeling, simulation, and program execution capabilities, or can be distinct from a technical computing environment. For example, code generator 140 can be a stand-alone component configured to consume graphical, textual, or a combination of graphical and textual code and output change-resistant models 131 and/or syntactical-change-resistant code 130. The code may be received from a technical computing environment and/or retrieved from data storage.

In some implementations, code generator 140 may be configured to generate syntactical change-resistant code 130 in response to user input, consistent with disclosed embodiments. For example, code generator 140 may be configured with a mode for generating new code 120 from new model 121 and a mode for generating syntactical change-resistant code 130 and/or change-resistant model 131 from original code 110 and/or original model 111 and new code 120 and/or new model 121. A user may interact with a user interface (e.g., a graphical user interface) to provide instructions to code generator 140 to select whether code generator 140 generates new code 120 or syntactical change-resistant code 130 and/or change-resistant model 131. In various embodiments, code generator 140 may be configured to automatically determine whether to generate new code 120 or syntactical change-resistant code 130 and/or change-resistant model 131. This automatic determination may depend on the inputs to code generator 140, such as a number of the inputs (e.g., a single model versus multiple models or code) or input parameters. Alternatively, code generator 140 may lack an option to generate new code 120 from new model 121. In such embodiments, code generator 140 may only be configured to generate syntactical change-resistant code 131.

Original code 110 may be computer code (e.g., imperative textual code) that has been previously prepared and used, consistent with disclosed embodiments. In some embodiments, original code 110 may be in use in an application. Original code 110 may have demonstrated a history of quality and reliability in this application. In some embodiments, original code 110 may have been tested for satisfaction of performance and reliability requirements for this application. For example, original code 110 may have been subject to verification and validation testing in accordance with a quality management system. In some implementations, the original code 110 complies with one or more coding standards, such as CERT C coding standard, MISRA C, of High Integrity C++. In some embodiments, original code 110 may have been generated from original model 111 using a first version of a first code generator, which may be a different code generator than change-resistant code generator 140. In some implementations, original code 110 may have been generated from original model 111 using a code-generating portion of an earlier version of change-resistant code generator 140.

Original model 111 may comprise a high-level specification or design of the functionality implemented by original code 110. Original model 111 may include graphical and/or textual components, and the graphical components may be in a declarative language. For example, original model 111 may be a graphical model (e.g., a model generated using one or more of Simulink®, Stateflow®, SysML, LabView®, Unified Modelling Language, SCADE, or the like). In some cases, the original model 111 may also include textual code, as described above. Original model 111 may have been generated in a first modeling environment configured according to a first set or configuration parameters. The original model 111 may be an executable model, that can be executed in a modeling or simulation environment 200 such as that described in connection with FIG. 2. In some cases, the syntactical-change-resistant code generator 140 can be included as part of the simulation environment 200 (e.g., an added tool).

New code 120 may be computer code, consistent with disclosed embodiments. New code 120 may have been developed to replace original code 110 in the original application (e.g., existing embedded systems on vehicles), for use in new applications (e.g., new embedded systems on new vehicles), or to extend the functionality of original code 110. In some aspects, new code 120 may have been generated from new model 121. For example, the model 121 may have been an updated model to include altered design/functionalities or new design/functionalities as compared to the original model 111, based on the need of the real-world system(s) the model 121 intends to represent. In another example, the new model 121 is the same as the original model 111, but the code generator used to produce new code 120 differs in some way from the code generator used to produce original code 110. In some aspects, new code 120 may have been generated from new model 121 using a same version of the same code generator or a different code generator (e.g., new or different version) than that used to generate original code 110.

Like the original model 111, new model 121 may include a high-level specification of the functionality implemented by new code 120. New model 121 may include graphical and/or textual components. For example, new model 121 may be primarily a graphical model (e.g., a model generated using one or more of Simulink®, Stateflow®, Labview®, SysML, SCADE, Unified Modelling Language, or the like). In some cases, the new model 121 may also include textual code, as described above. New model 121 may have been generated in a first modeling environment configured according to a first set or configuration parameters. The new model 121 may be an executable model, that can be executed in a modeling or simulation environment 200 such as that described in connection with FIG. 2.

Syntactical-change-resistant code 130 can be textual code, consistent with disclosed embodiments. As detailed herein, syntactical-change-resistant code 130 can generally be comprised of three different portions in comparison to the original code 110: (1) portions that are semantically, structurally, and syntactically equivalent to corresponding portions of the original code 110 or code that would be generated from the original model 111, (2) portions that have no semantic, structural, and syntactic equivalence in the original code 110 or code that would be generated from the original model 111, and (3) portions that may have semantic equivalence in the original code 110 or code that would be generated from the original model 111 but are structurally and/or syntactically non-equivalent to the corresponding semantically equivalent portions. The first portions are portions that are originally within the new code and the same as within the old code, or have been stubbed-in or preserved from the old code in the change-resistant code 130 by the change-resistant code generator 140 in order to utilize legacy, reliable field-tested code as much as possible. Some portions of the old code may be stubbed-out (e.g., deactivated by commenting out or not included in change-resistant code) if their functionality has been deprecated. The second portions may represent modifications and/or new functionality made and/or added after the original code 110 is produced. In some cases, the second portions may originate from, e.g., stubbed out, the new code 120 and included into, e.g., stubbed in, to the change-resistant code 130 based on information generated based on the first portions, as explained previously. The third portions may correspond to instances where a user, e.g., a program developer intentionally allows syntactic or structural changes in a portion of the change-resistant code 130 even though that portion is semantically equivalent to a portion of the original code 110. In some cases, the third portions may be stubbed-out of the new code 120 and stubbed-in to the change-resistant code 130. Consistent with disclosed embodiments, the semantically equivalent, semantically non-equivalent, stubbed-in, and stubbed-out portions may be specified at any level of granularity, including file, library, class, function, or expression levels.

Like models 111, 121, change-resistant model 131 may include a high-level specification of the functionality implemented by syntactical change-resistant code 130. Change-resistant model 131 may include graphical and/or textual components. For example, change-resistant model 131 may be primarily a graphical model (e.g., similar in appearance to a model generated using one or more of Simulink®, Stateflow®, Labview®, SysML, SCADE, Unified Modelling Language, or the like). In some cases, the change-resistant model 131 may also include textual code, as described above. The change-resistant model 131 may be an executable model, that can be executed in a modeling or simulation environment 200 such as that described in connection with FIG. 2. In some embodiments, the change-resistant code generator 140 may be configured to generate a change-resistant model 131, and optionally generate syntactical change-resistant code 130 from the change-resistant model 131. In some embodiments, code generator 140 can be configured to generate change-resistant code 130, then generate change-resistant model 131 from syntactical change-resistant code 130.

In some cases, code generator 140 may be configured to generate change-resistant model 131 and/or syntactical change-resistant code 130 from, for example, an intermediate representation. The intermediate representation may have been generated by the code generator 140 from input original code 110 and/or original model 111 and new code 120 and/or new model 121, for example. According to some embodiments, change-resistant code generator 140 can generate change-resistant code 130 directly from an intermediate representation of a new model 121 along with the original code 110 and/or original model 111 as inputs. The new model may also be available as an input. In such an embodiment, new code 120 need not be generated from the new model 121. In another embodiment, new code 120 can be generated from a new model 121 and used as an input, along with the original code 110 and/or original model 111, to generate syntactical change-resistant code 130.

Example Modeling and Simulation Environment

Figure 2:
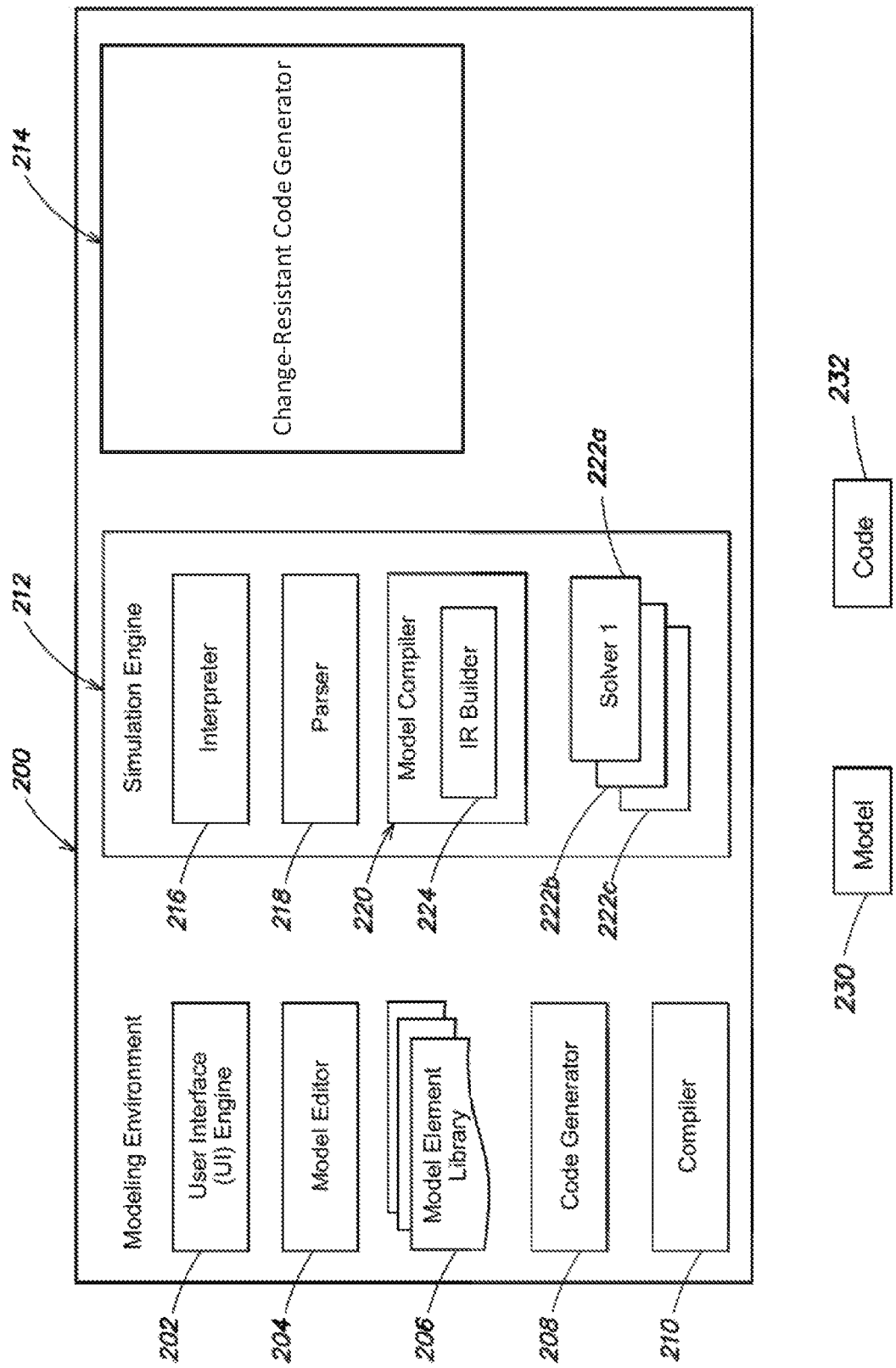
FIG. 2 depicts an example of a simulation environment in which a model can be produced and that may later be updated in accordance with embodiments of the present invention.

An example of a modeling and simulation environment 200 that may be used in accordance with the described embodiments is illustrated in FIG. 2. The drawing illustrates a partial, schematic example of a simulation environment 200 in accordance with an embodiment. The simulation environment 200 may include a User Interface (UI) engine 202, a model editor 204, one or more model element libraries indicated at 206, a code generator 208, a compiler 210, a simulation engine 212, a syntactical change resistant code/model generator 214, and other components not shown. The UI engine 202 may create and present one or more User Interfaces (UIs), such as Graphical User Interfaces (GUIs) and/or Command Line Interfaces (CLIs), on a display of a data processing device, such as a workstation, laptop, tablet, etc. The GUIs and CLIs may provide a user interface to the simulation environment 200, such as a model editing window. The model editor 204 may perform selected operations on a model, such as open, create, edit, and save, in response to the user inputs or programmatically.

The simulation engine 212 may include an interpreter 216, a parser 218, a model compiler 220, and one or more solvers, such as solvers 222a-c. The model compiler 220 may include one or more Intermediate Representation (IR) builders, such as IR builder 224. In some implementations, one or more IR builders may be included or associated with the solvers 222. The simulation engine 212 may execute, e.g., compile and run or interpret, computer-generated, executable models using one or more of the solvers 222a-c. For example, the solvers 222 may generate a set of equations for a model, and may solve the set of equations. The solvers 222 may also generate a solution for an in-memory, intermediate representation (IR) of a model that represents a set of equations. The solvers 222 may generate the solution for the IR using numerical techniques. Exemplary solvers include one or more fixed-step continuous time solvers, which may utilize numerical integration techniques, and one or more variable-step solvers, which may for example be based on the Runge-Kutta and Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the Simulink User's Guide from The MathWorks, Inc. (March 2017 ed.)

The code generator 208 may access a model, such as model 230, and may generate code, such as code 232, for the model 230. In some embodiments, the generated code may be source code, which may be compiled by the compiler 208, and executed by one or more processors outside of the simulation environment 200. The generated code may thus be standalone code relative to the simulation environment 200. Examples of generated code include Ada, Basic, C, C++, C#, FORTRAN, assembly code, and Hardware Description Language (HDL) code, such as VHDL, Verilog, or SystemC, among others, which may be used to synthesize a programmable logic device.

Exemplary simulation environments include the MATLAB® technical computing environment (TCE) and the Simulink® model-based design environment both from The MathWorks, Inc. of Natick, Mass., as well as the Simscape® physical modeling system, the SimEvent® discrete-event modeling tool, and the Stateflow® state chart tool also from The MathWorks, Inc., the MapleSim physical modeling and simulation tool from Waterloo Maple Inc. of Waterloo, Ontario, Canada, the GTSUITE modeling and simulation environment from Gamma Technologies, LLC of Chicago, Ill., the Ricardo WAVE and WAVE RT modeling and simulation tools of Ricardo Software of Chicago, Ill., a subsidiary of Ricardo plc, the AVL Boost modeling and simulation tool of AVL Gmbh of Graz, Austria, the LabVIEW® virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level simulation environment may contain less implementation detail, and thus operate at a higher level than certain programming languages, such as the C, C++, C#, and SystemC programming languages.

A given model may simulate, e.g., approximate the operation of, a system, such as any of the systems described above. Exemplary systems include, but are not limited to, physical systems, such as plants, vehicles, intelligent machines, intelligent appliances, advanced analytical computer applications, and controllers. A model may be executed in order to simulate the system being modeled, and the execution of a model may also be referred to as simulating the model. Models constructed within the simulation environment 200 may include textual models, graphical models, such as block diagrams, state-based models, discrete-event models, physical models, and combinations thereof. A graphical model may include icons or blocks that represent computations, functions, or operations, and interconnecting lines or arrows among the blocks may represent data, signals, or relationships among those computations, functions, or operations. The icons or blocks, moreover, may be selected by the user from one or more of the libraries or palettes 206 that contain icons or blocks for the blocks supported by the simulation environment 200. A model editor GUI may include a Run button that may be selected by the user. The simulation environment 200 may also be configured to receive a run command entered by the user, e.g., in the GUI or in a Command Line Interface (CLI). In response to the user selecting the Run button or entering the run command, the simulation engine 212 may execute the model, and may present the results of the model's execution to a user. Exemplary graphical models include Simulink® models, Simscape® physical models, SimEvent® models, Stateflow® charts, LabVIEW® block diagrams, MatrixX models, SCADE models, and VEE diagrams, among others. Other forms of the source program 312 include Modelica models from the Modelica Association, Uniform Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the simulation environment 200 may implement a declarative language or a combination of one or more declarative languages and/or imperative languages. A declarative language is a language that expresses the logic of a computation without describing its control flow. A declarative language may describe what a program must accomplish in terms of the problem domain, rather than describe how to accomplish it as a sequence of the programming language primitives. In some cases, a declarative language may implement single assignment in which variables are assigned once and only once. Examples of declarative languages include the Simulink® model-based design environment, which is a time-based language, the Modelica modeling language, and the LabVIEW® graphical programming system, Hardware Description Language (HDL), the Prolog language, and the Haskell language, among others. Behaviors of at least some of the model elements and connection elements of a model may include computational implementations that are implicitly defined by a declarative language.

It should be understood that the simulation environment 200 is intended for illustrative purposes and that the present disclosure may be used with other simulation environments. For example in some implementations, the code generator 208 and/or the compiler 210 may be separate from the simulation environment 200. In some implementations, code generator 208 or 214 may include or have the same functionalities of the syntactical-change-resistant code generator 140. Code generators 208, 214 may be the same code generator or may be two distinct generators, within the environment 200 or external to the environment 200.

One or more of the user interface engine 202, the model editor 204, the code generator 208, the compiler 210, the simulation engine 212, and the model rescaling tool 214 may be implemented through one or more software modules or libraries containing program instructions that perform the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some embodiments, one or more of the user interface engine 202, the model editor 204, the code generator 208, the compiler 210, the simulation engine 212, and the model rescaling tool 214 may comprise hardware registers and combinational logic configured and arranged to produce sequential logic circuits. In some embodiments, various combinations of software and hardware, including firmware, may be utilized to implement the described methods.

Suitable code generators 208 that may be used to generate code from a model include, but are not limited to, the Simulink® Coder, the Embedded Coder, and the Simulink® HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers may be used.

Example Computing Environment

Figure 3:
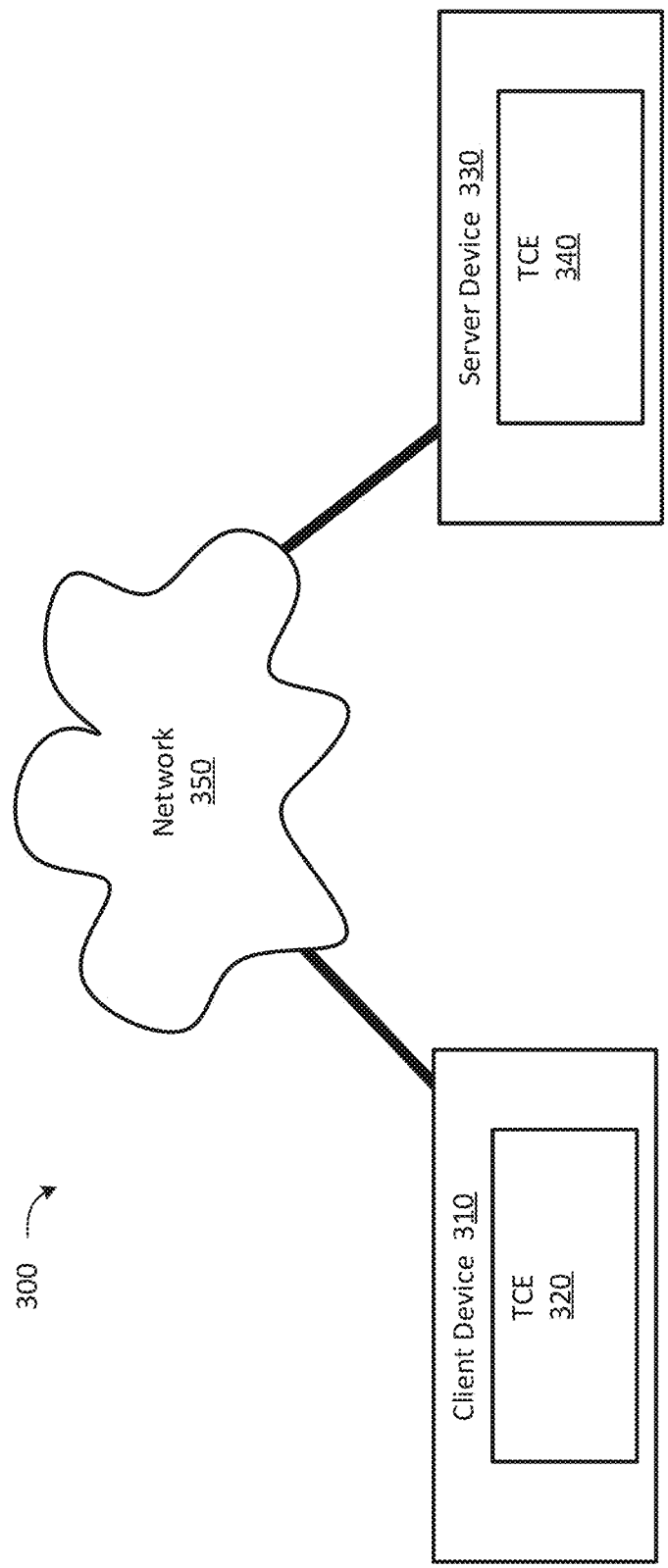
FIG. 3 depicts an example of a computing environment in which systems and/or methods described herein may be implemented.

FIG. 3 is a diagram of an example computing environment 300 in which systems and/or methods described herein may be implemented. As shown in FIG. 3, environment 300 may include a client device 310, which may include a technical computing environment (TCE) 320. Furthermore, environment 300 may include a server device 330, which may include a TCE 340. Client device 310 and server device 330 may be connected via a network 340. Devices of environment 300 may interconnect via wired connections, wireless connections, or a combination of wired and wireless connections.

Client device 310 may include one or more devices capable of receiving, generating, storing, evaluating, and/or providing code and/or information associated with code (e.g., a result of evaluating code). For example, client device 310 may include a computing device, such as a desktop computer, a laptop computer, a tablet computer, a handheld computer, a server, a mobile phone (e.g., a smart phone, a radiotelephone, etc.), a microprocessor, and microcontroller, or any suitable device having at least one processor. In some implementations, client device 310 may include an embedded device, such as a microcontroller (e.g., an Arduino microcontroller, a device utilizing an ARM architecture, a device utilizing an x86 architecture, etc.). In some implementations, client device 310 may evaluate code by, for example, executing the code, determining an error associated with the code (e.g., by validating the code, debugging the code, etc.), determining information associated with the code (e.g., determining help information associated with the code), or the like. In some implementations, client device 310 may receive information from and/or transmit information to server device 330 (e.g., code and/or information associated with code).

Client device 310 may host a TCE 320. According to some embodiments, TCE 320 may include any hardware-based component or a combination of hardware and software-based components that provides a computing environment that allows tasks to be performed (e.g., by users) related to disciplines, such as, but not limited to, mathematics, science, engineering, medicine, and business. In some cases, TCE 320 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

In some implementations, TCE 320 may include, for example, a user interface that provides a code editor portion that permits a user to input code (e.g., textual code, graphical code, etc.). Additionally, or alternatively, TCE 320 may include a user interface that provides a code evaluation portion that provides results corresponding to code displayed in the code editor portion. TCE 320 may provide one or more correspondence indicators that indicate a correspondence between different portions of code and respective results associated with the different portions of code. TCE 320 may permit a user to input one or more configuration parameters that may control, for example, a manner in which a result is displayed and/or provided, a manner in which code is displayed and/or provided, a manner in which a correspondence indicator is displayed and/or provided, or the like.

Server device 330 may include one or more devices capable of receiving, generating, storing, evaluating, and/or providing code and/or information associated with code. For example, server device 330 may include one or more computing devices, such as a server or server farm, a desktop computer, a laptop computer, a tablet computer, a handheld computer, a mobile device, or a similar device. In some implementations, server device 330 may include an embedded device, such as a microcontroller (e.g., an Arduino microcontroller, a device utilizing an ARM architecture, a device utilizing an x86 architecture, etc.). In some implementations, server device 330 may host TCE 340. In some implementations, client device 310 may be used to access one or more TCEs 340 running on one or more server devices 330. For example, multiple server devices 330 may be used to evaluate code (e.g., serially or in parallel) and may provide respective results of evaluating the code to client device 310.

In some implementations, TCE 340 of server device 330 may have the same functionality as TCE 320 of client device 310. According to some implementations, TCE 340 of server device 330 may have more functionality than TCE 320 of client device 310. For example, TCE 340 may contain more mathematical algorithms and/or libraries than TCE 320 of client device 310, which may be accessed by client device 310 for use over the network 350.

In some implementations, client device 310 and server device 330 may be owned by different entities. For example, an end user may own client device 310, and a third party may own server device 330. In some implementations, server device 330 may include one or more devices operating in a cloud computing environment. In this way, front-end applications (e.g., a user interface) may be separated from back-end applications (e.g., code execution).

Network 340 may include one or more wired and/or wireless networks. For example, network 340 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 3 is provided as an example. In practice, there may be additional devices and/or networks, different devices and/or networks, and/or differently arranged devices and networks than those shown in FIG. 3. Furthermore, two or more devices shown in FIG. 3 may be implemented within a single device, or a single device shown in FIG. 3 may be implemented as multiple, distributed devices. Additionally, one or more of the devices of environment 300 may perform one or more functions described as being performed by another one or more devices of environment 300.

Example Device Architecture

Figure 4:
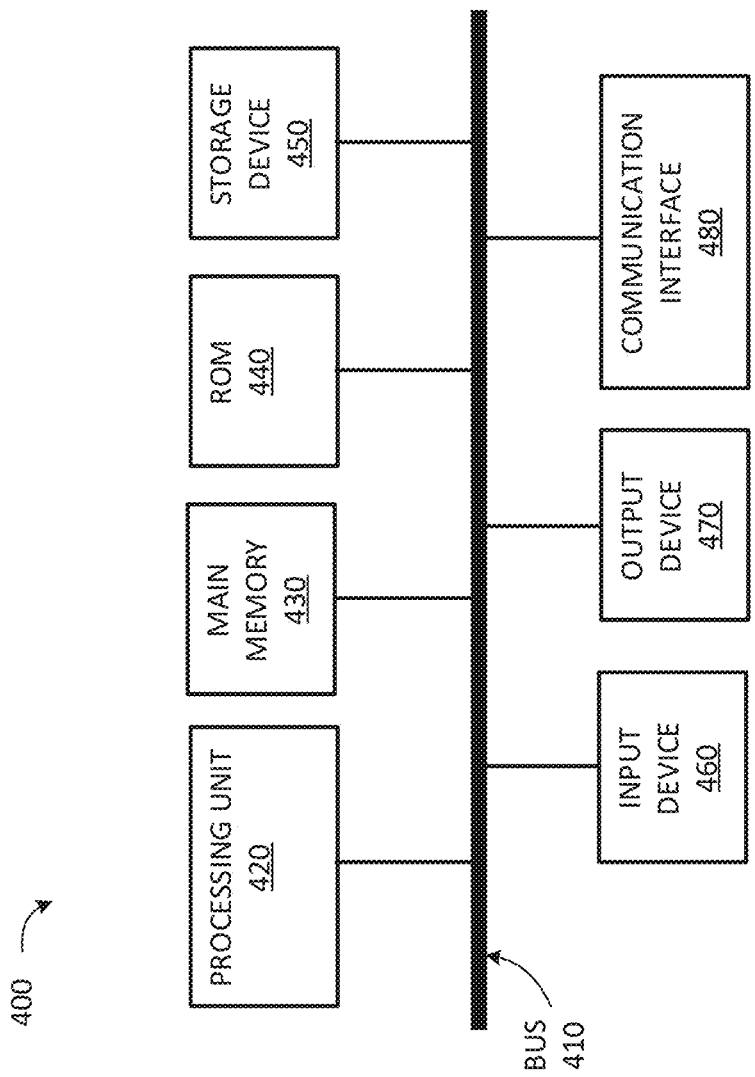
FIG. 4 depicts an example schematic of one or more of the devices of the environment depicted in FIG. 3.

FIG. 4 is a diagram of example components of a computing device 400, which may correspond to client device 310 and/or server device 330. In some implementations, client device 310 and/or server device 330 may include one or more devices 400 and/or one or more components of device 400. As shown in FIG. 4, device 400 may include a bus 410, a processor 420, a main memory 430, read-only memory 440, a storage device 450, an input device 460, an output device 470, and a communication interface 480. In some implementations, storage device 450, input device 460, output device 470, and communication interface 480 may be peripheral components of the computing device 400.

Bus 410 may include a component that permits communication among the components of device 400. Processor

420 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 420 may include multiple processor cores for parallel computing. Memory 430 may include a random access memory (RAM), a read only memory (ROM), and/or another type of dynamic or static storage component (e.g., a flash, magnetic, or optical memory) that stores information and/or instructions for use by processor 420.

Storage component 450 may store information and/or software related to the operation and use of device 400. For example, storage component 450 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 450 may store code for TCE 320.

Input component 460 may include a component that permits a user to input information to device 400 (e.g., a touch screen display, a keyboard, a keypad, a mouse, a button, a switch, etc.). Output component 470 may include a component that outputs information from device 400 (e.g., a display, a speaker, one or more light-emitting diodes (LEDs), etc.).

Communication interface 480 may include a transceiver-like component, such as a transceiver and/or a separate receiver and transmitter, that enables device 400 to communicate with other devices, such as via a wired connection, a wireless connection, or a combination of wired and wireless connections. For example, communication interface 480 may include an Ethernet interface, an optical interface, a coaxial interface, an infrared interface, a radio frequency (RF) interface, a universal serial bus (USB) interface, a high-definition multimedia interface (HDMI), or the like.

Device 400 may perform one or more processes described herein. Device 400 may perform these processes in response to processor 420 executing software instructions included in a computer-readable medium, such as memory 430, read-only memory 440, and/or storage component 450. A computer-readable medium may be defined as a non-transitory memory device. A memory device may include memory space within a single physical storage device or memory space spread across multiple physical storage devices.

Software instructions may be read into memory 430 and/or storage component 450 from another computer-readable medium or from another device via communication interface 480. When executed, software instructions stored in memory 430 and/or storage component 450 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 4 is provided as an example. In practice, device 400 may include additional components, fewer components, different components, or differently arranged components than those shown in FIG. 4. Additionally, or alternatively, one or more components of device 400 may perform one or more functions described as being performed by another one or more components of device 400.

In some implementations, the example modeling and simulation environment of FIG. 2 and the example computing environment of FIG. 3 can be implemented as one environment or separate environments, usable or executable on the example architecture shown in FIG. 4. The syntactical resistant code/model generation process or coder can be implemented within an environment the same as or similar to those shown in FIG. 2 or 3.

Exemplary Syntactical Change-Resistant Code Generation

Figure 5C:
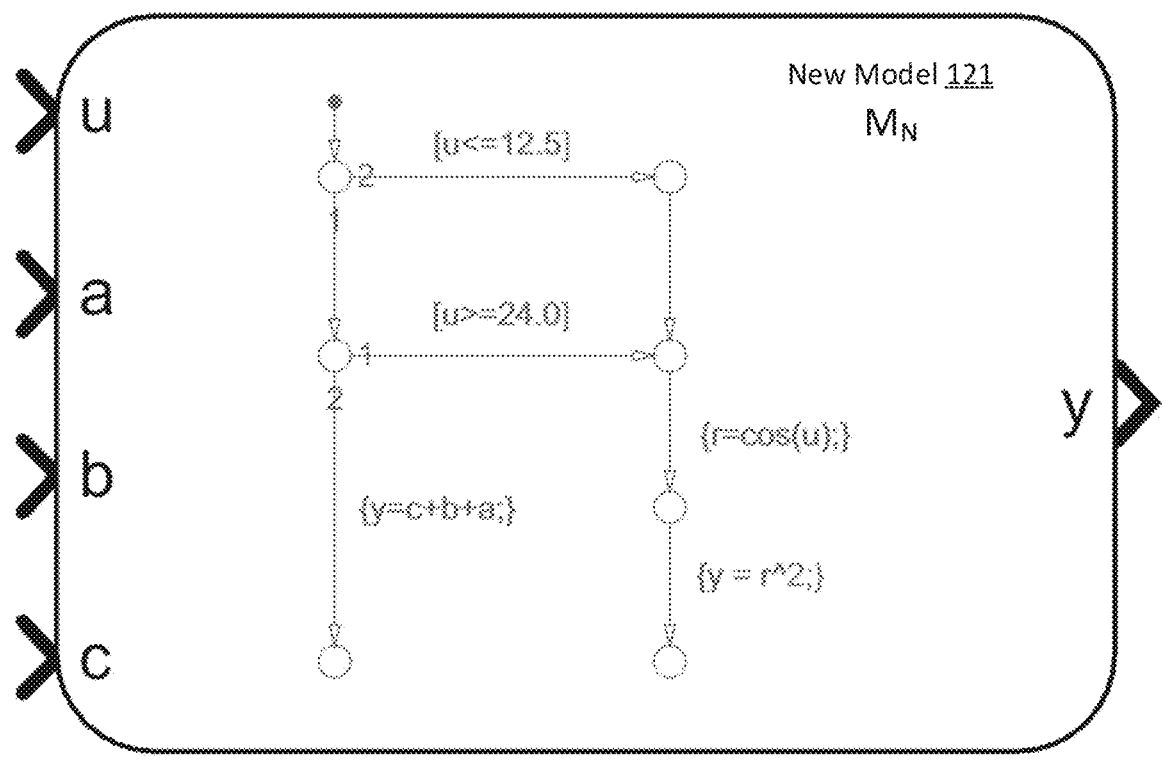
Figure 5D:
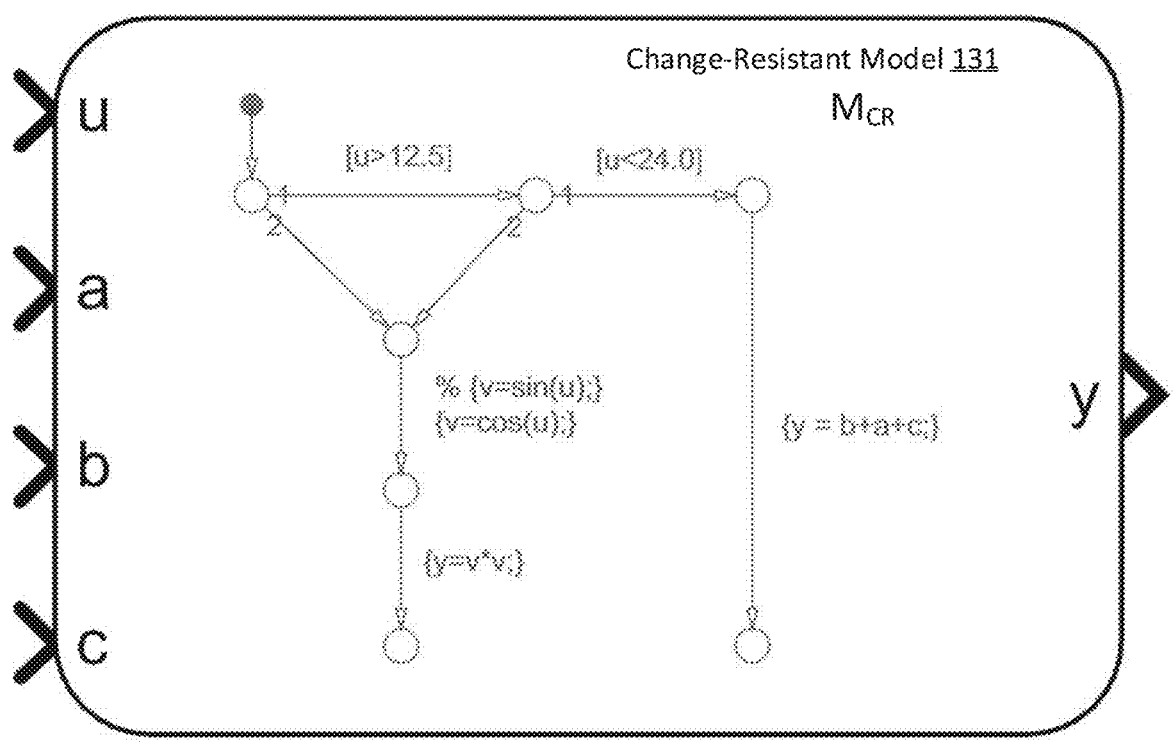
Figure 5E:
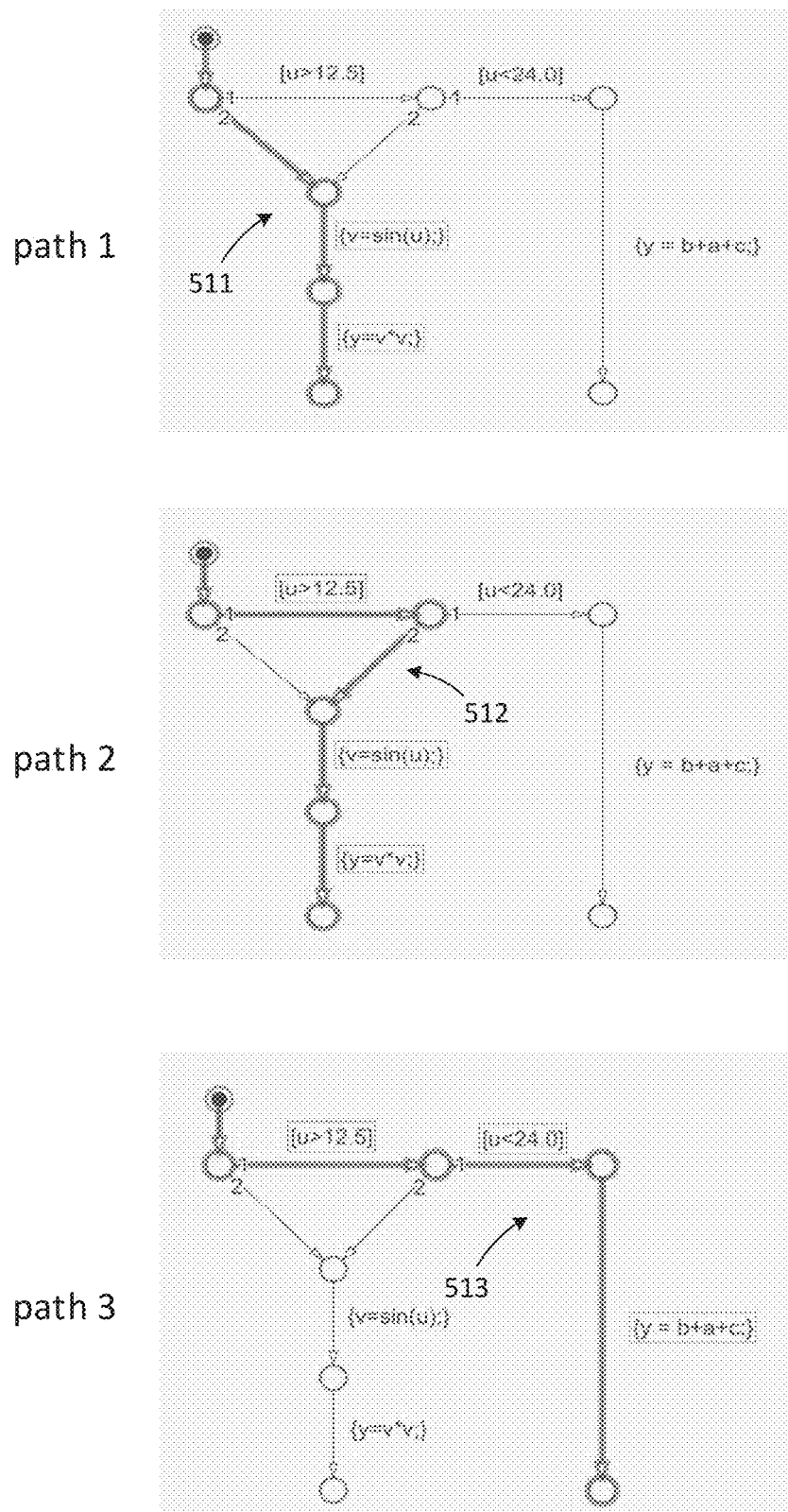
FIG. 5E, FIG. 5F, and FIG. 5G illustrate examples of execution paths.
Figure 5F:
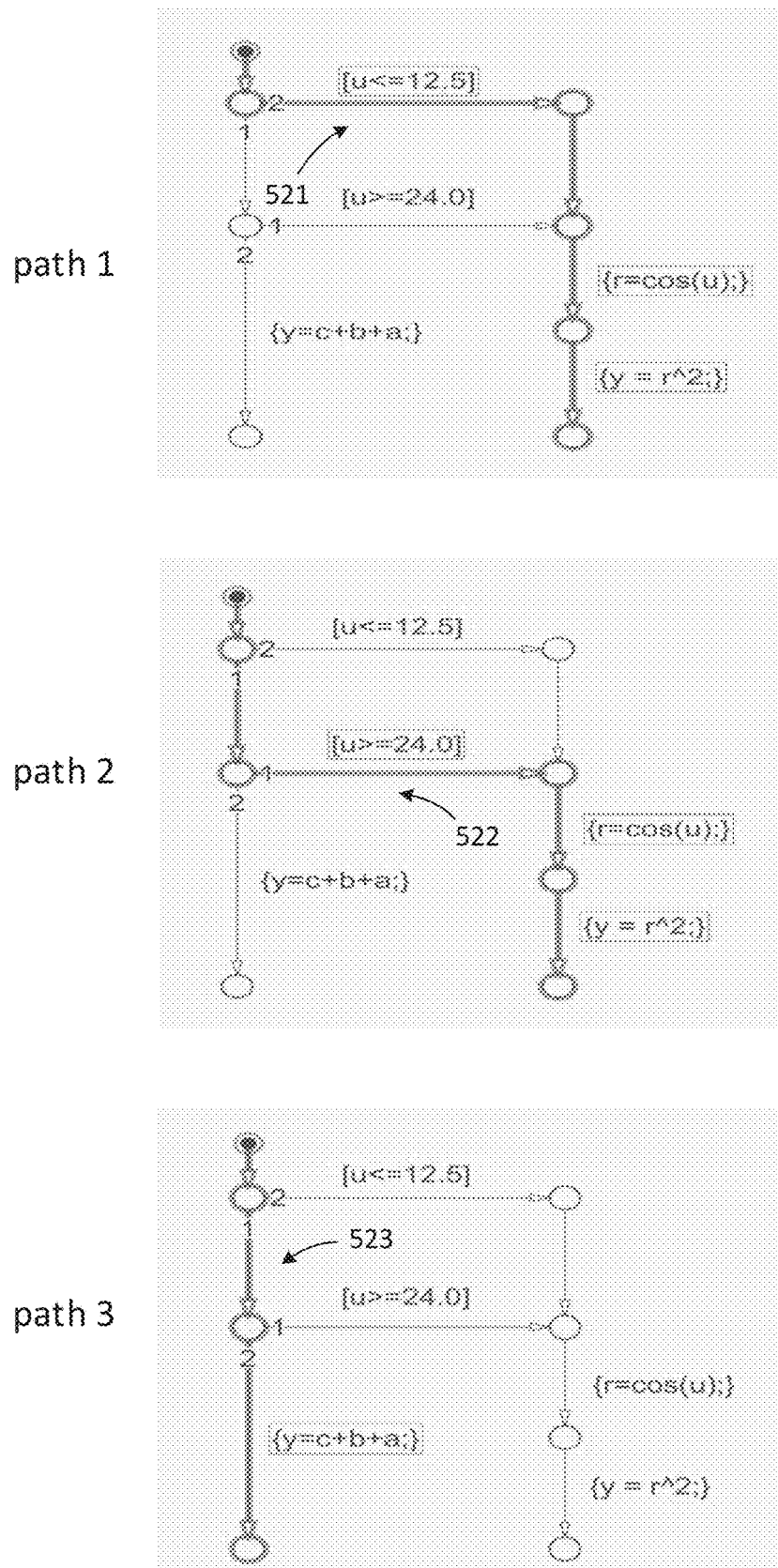
Figure 5G:
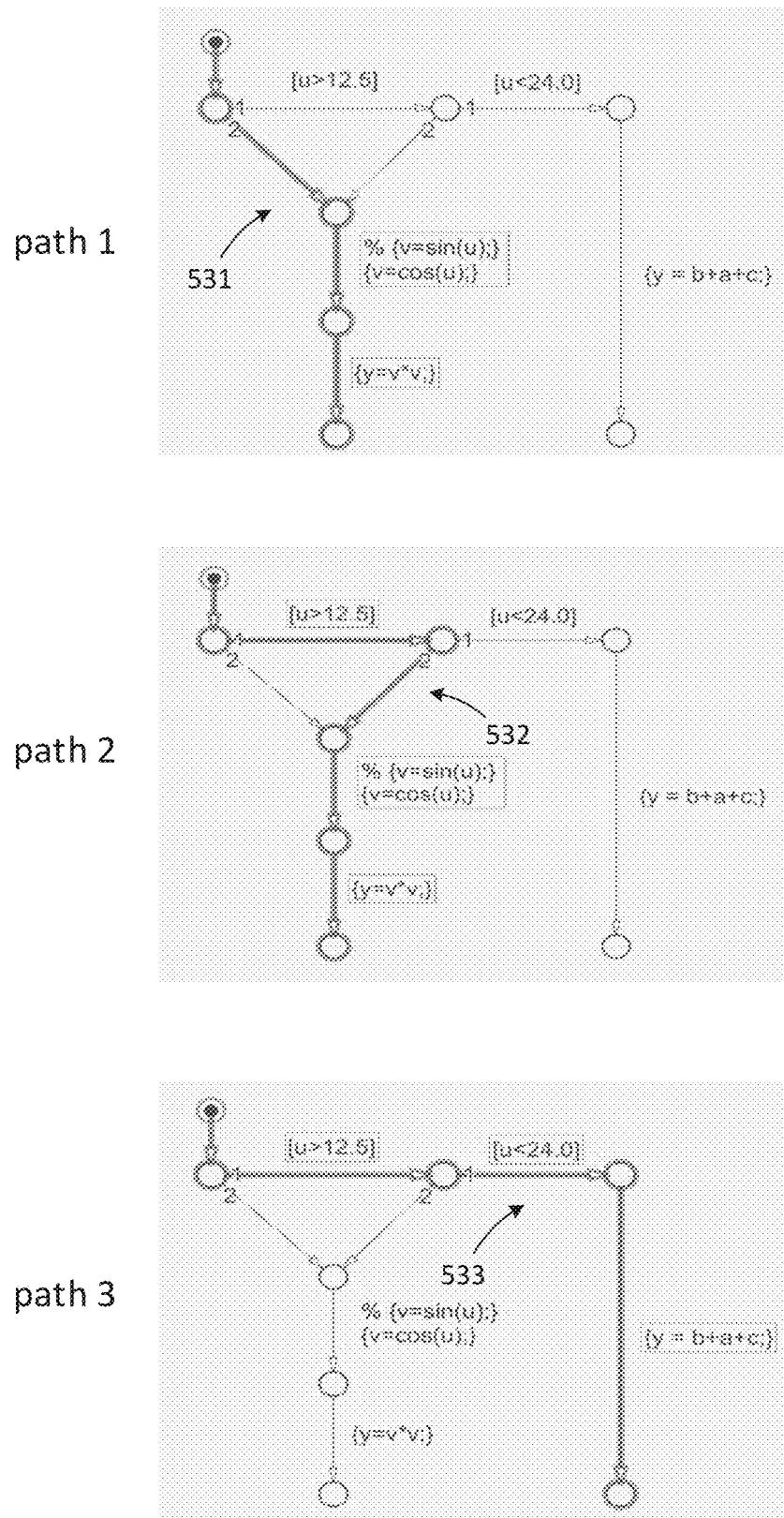

For further explanation purposes, FIG. 5A depicts example portions of original code 110, new code 120, and syntactical-change-resistant code 130 that may be generated in accordance with embodiments of the present invention. To aid in explanation, simplified portions of code are illustrated though the invention applies to lengthy and complex code bases. FIGS. 5B, 5C, and 5D show models, e.g., models that are executable in the modeling/computing environments, that correspond to the original code 110, new code 120, and syntactical-change-resistant code 130, respectively. In some implementations, the code 110, 120 can be respectively generated from the original model of FIG. 5B, and the new model of FIG. 5C. As explained with respect to FIG. 1, various combinations of inputs, e.g., original code 110 and new code 120, or original code 110 and new model of FIG. 5C, or original model of FIG. 5C and new model of FIG. 5D, etc., can be provided as input to a syntactical-change-resistant code generation process to generate the syntactical-change-resistant code 130 and/or the syntactical-change-resistant model of FIG. 5D. Additionally, traceability, e.g., one direction or bi-directional as described above, between code and model, and differences between code and between models, etc., can be provided among the code and models of FIGS. 5A-5D, as explained previously. Furthermore, FIGS. 5E-5G show execution paths corresponding to code 110, 120, 130 or models of FIGS. 5B-5D, respectively. The execution paths can be example program slices described above for use in determining sematic differences/equivalences between code 110, 120, or models of FIGS. 5B and 5C and/or for use in stubbing in the semantically different portions of the code 120 of the model of FIG. 5C in the code 130 or the model of FIG. 5D.

As shown in FIG. 5A, the example portions of the original code 110 and new code 120 both determine whether the value of a variable "u" is within or outside a specific range of values and take different actions depending on whether the value is within or outside the range. If the value of the variable "u" is within the range of values (between 12.5 and 24.0 in this example), then the variable "y" is assigned the sum of the values of variables "a", "b", and "c". If the value of "u" is outside this range, the variable "y" is assigned the square of another value: "v=sin(u)" in the original code 110 or "r=cos(u)" in the new code 120. The original code 110 can be field-tested, reliable code that has been in service for an extended period of time (e.g., months or years). Original code may have been generated using an original model 111, an example of which is illustrated in FIG. 5B, or may be produced manually. The model 111 may take "u," "a," "b," and "c" as inputs and output a value for "y." For explanation purposes, the original model 111 is depicted as a graphical model that also includes textual code elements for paths that link nodes in the model, however the original model may be any suitable model.

New code 120 can be updated code that is intended to replace the original code 110. New code 120 may include new functionalities not present in original code 110 or may not include some functionalities that are present in original code 110. New code 120 may be produced from a new model 121, such as that illustrated in FIG. 5C. Although there are similarities between the new code 120 and original code 110 and between the new model 121 and original model 111, semantic, structural, and syntactic differences are manifest in the new code 120 and new model 121. A semantic similarity is determining whether a received value of "u" is between 12.5 and 24.0, though the way in which this determination is made is syntactically different. A syntactic difference and semantic equivalence exists between the new code and original code when it is determined that "u" lies within this range: for the new code 120 the corresponding instruction is "y=c+b+a" vs. the syntactically different instruction "y=b+a+c" for the old code 110). Semantic, structural, and syntactic differences are present when "u" lies outside this range. For example, in the new code 120 the value of "y" is assigned a value of "r*r" where "r=cos(u)," whereas in the original code 110 the value of "y" is assigned a value of "v*v" where "v=sin(u)."

An example of syntactical-change-resistant code 130 is shown in FIG. 5A and a corresponding change-resistant model 131 is shown in FIG. 5D. The change-resistant code 130 and model 131 may be produced by a syntactical-change-resistant code generator 140 described above. In some embodiments, the syntactical-change-resistant code generator 140 operates to preserve in the change-resistant code 130 syntax from the original code 110 for which syntactically different but semantically equivalent code appears in the new code 120. In the illustrated example, the syntax of the if-else conditional statement is preserved along with the statement "y=b+a+c". Further, the variable "v" is preserved from the original code 110 rather than introducing the new variable "r" from the new code 120. In this regard, the notion of non-semantic change-reluctance can be associated with the syntactical-change-resistant code generator 140. For example, it resists non-semantic changes in the new code 120 from propagating to the change-resistant code 130. The change-resistant model 131 more closely resembles the original model 111 than the new model 121 and yet is semantically equivalent to the new model 121 even though the new model 121 is not semantically equivalent to the original model 111.

FIG. 5E through FIG. 5G illustrate possible code execution paths (1, 2, 3) that depend upon the input value of "u" to each of the code portions that correspond respectively to the models in FIG. 5B through FIG. 5D. The paths are illustrated in bold line using the corresponding model illustrations. By comparison, the overall execution paths 521, 522, 523 for the new model $M_N$ and new code 120 have semantic, syntactic, and structural differences from corresponding execution paths 511, 512, 513 for the original model $M_O$ and original code 110. For example, execution path 521 for the new code 120 proceeds through four nodes before setting a value for "y," whereas the execution path 511 for the original code 110 proceeds through three nodes before setting a different value for "y." On the other hand, execution paths 531, 532, 533 for the change-resistant model and code 130 are syntactically and structurally similar to execution paths 511, 512, 513 of the original code (as can be seen by comparing FIG. 5G and FIG. 5E) and yet semantically equivalent to execution paths of the new code (e.g., compare FIG. 5G with FIG. 5F).

Figure 6:
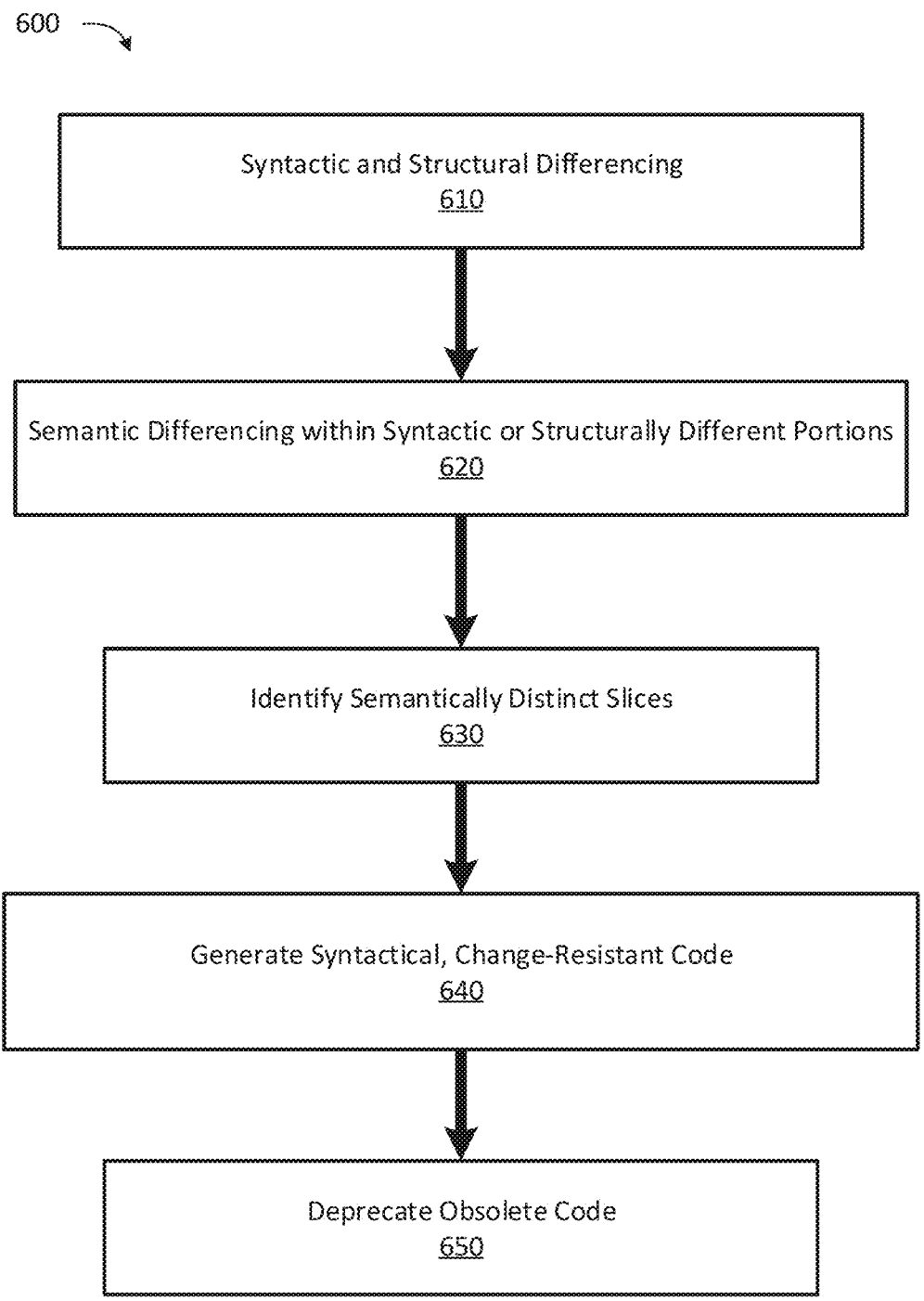
FIG. 6 depicts an example of a process of syntactical change-resistant code generation.

An example syntactical-change-resistant code-generation process 600 that may be performed by the change-resistant code generator 140 is illustrated in FIG. 6. A process 600 can be performed on code received, retrieved, and/or created by a simulation environment including a code generator (e.g., a technical computing environment as described above with regards to FIG. 3). For example, one or more of the original code 110 or new code 120 can be received from another program or device or input by a user. As an additional example, one or more of the original code 110 or new code 120 can be retrieved from a computer memory communicatively accessible to one or more computing devices executing the simulation environment (e.g., a client or server, as described above with regards to FIG. 3 and FIG. 4). According to some embodiments, a process 600 can include at least acts of performing syntactic and structural differencing (act 610) on the original code 110 and new code 120 and performing semantic differencing (act 620) on portions and/or sub-portions of the original code 110 and new code 120 for which syntactic and structural differences have been found. The process can further include identifying (act 630) semantically distinct slices of the old code 110 and new code 120 and generating (act 640) syntactical, change-resistant code. A syntactical-change-resistant code-generation process 600 can also include deprecating (act 650) code portions that are no longer in use. The steps of process 600 may not be performed in the order shown and some steps may be performed more than once. For example, the act of identifying slices (act 630) may occur additionally or alternatively before performing semantic differencing (act 620).

According to some embodiments, in an initial step, a syntactical, change-resistant code-generating system may perform syntactic and structural differencing (act 610) on the original code 110 (and/or original model 111) and new code 120 (and/or new model 121) using syntactic or structural differencing techniques (also referred to as non-semantic differencing techniques). In this initial step, a change-resistant code generator 140 may identify portions of the new code 120 (and/or new model 121) and original code 110 (and/or original model 111) in which syntactic and/or structural differences are present. Techniques for determining syntactic and/or structural differences include, but are not limited to techniques based on longest common subsequence (LCS) methods, differential static analysis, etc. In general, a code generator (e.g., change-resistant code generator 140) can be configured to identify corresponding portions and/or sub-portions of original code 110 (and/or original model 111) and new code 120 (and/or new model 121) that are syntactically and/or structurally equivalent as well as portions and/or sub-portions of original code 110 (and/or original model 111) and new code 120 (and/or new model 121) that are syntactically and/or structurally different. For example, non-semantic differencing techniques, such as those based on longest common subsequence method (LCS), may be used to identify structural and/or syntactic changes between original code 110 (and/or original model 111) and new code 120 (and/or new model 121). In some implementations, direct automated textual analysis and comparison of the source codes and/or models can be performed additionally or alternatively to identify syntactic and/or structural differences. For the example illustrated in FIG. 5A, syntactic and structural differences between the new code 120 and original code 110 can be identified using such differencing techniques for the code portion containing the conditional "if-else" statements.

In the example shown in FIG. 5A, the original code 110 and the new code 120 contain a line of code z=f(y), which is syntactically and structurally equivalent by the line itself. However, the variable y appears in the syntactical and/or structural different code portions and are computed differently (semantically different) in the new code and original code. Accordingly, the line of code z=f(y) is semantically different in the original and new code, even though they appear to be structurally and syntactically equivalent. In some implementations, the correspondence of the code slices shown in original code 110 and new code 120, except for the line z=f(y), can be established based on the analysis of the line z=f(y), as explained previously. For example, the variable y can be used as a seed to form the slice for comparison based on the syntactical and structural equivalence found in z=f(y). Model/code parts corresponding to the line of code z=f(y) are not shown in FIGS. 5B-5G. However, the analysis described here and below can be readily applicable to the examples shown in FIGS. 5B-5G.

A change-resistant code-generation process 600 can further include performing semantic differencing (act 620) on each portion and/or sub-portions of the original code 110 and new code 120 (and/or corresponding models) for which syntactic and/or structural differences have been identified. For brevity in connection with the description of process 600, reference to the original code 110 may refer to the original model 111 additionally or in the alternative, and reference to the new code 120 may refer to the new model 121 additionally or in the alternative. During the step of semantic differencing, the original code and new code portions may be analyzed to identify semantically equivalent and/or semantically different sub-portions between the new code 120 and corresponding sub-portion of original code 110, or between the portions themselves. Various semantic differencing techniques may be used. Example semantic differencing techniques include, but are not limited to abstract semantic differencing, semantic-graph differencing, symbolic differencing, abstract semantic difference via speculative correlation, Boolean satisfiability problem solvers, or the like. These semantic differencing methods can enable identification of semantic difference or, conversely, equivalency between portions of code that appear syntactically and/or structurally changed.

In the example shown in FIGS. 5A-5G, semantic differencing based on program slices constructed by execution paths is performed. In particular, the execution paths shown in FIG. 5E correspond to the original code 110 or the original model of FIG. 5B; the execution paths shown in FIG. 5F correspond to the new code 120 or the new model of FIG. 5C; and the execution paths shown in FIG. 5G correspond to the change-resistance code 130 or the change-resistant model of FIG. 5D. The execution paths or program slices generated based on the execution paths can be in different formats than those shown in FIGS. 5E-5F. For example, the program slices or execution paths can be stored in data structures, graphs, readable or non-readable by human.

Alternatively, semantic differencing can also be performed based on the slicing (or clustering) analysis based on, for example, both the syntactical and structural equivalent portions (e.g., z=f(y)) and different portions. For example, y=v*v and y=r*r, and y=b+a+c and y=c+b+a can be determined as semantically equivalent within the syntactical and/or structural different portions, while v=sin(u) and r=cos(u) can be determined to be semantically different within the same portions.

A change-resistant code generator analyzes the program slices or the execution paths in this example and identifies that the path 513 of FIG. 5E is syntactically and structurally different from the path 523 of FIG. 5F, but semantically equivalent. Furthermore, the change-resistant code generator identifies that the execution path 511 of FIG. 5E corresponds to the execution path 521 of FIG. 5F because effectively, both are executing the branch "u<=12.5". Within these corresponding paths/slices, semantic equivalence between y=v*v and y=r^2 is determined. However, semantically there is a difference between v=sin(u) and r=cos(u). Similarly, for path 512 and its corresponding path 522, the same semantic equivalence and difference within the paths are identified.

In some embodiments, one or more default settings of the change-resistant code generator 140 can specify the one or more difference criteria. In various embodiments, the difference criteria can be specified in response to user inputs (e.g., by way of user interactions with a graphical user interface), or configuration information obtained by the code generator from another device, program, or a memory accessible to the code generator.

In some embodiments, a change-resistant code generator 140 can be configured to apply one or more granularity criteria for syntactic differencing and/or semantic differencing. A granularity criterion can specify one or more program components (e.g., expression, function, procedure, method, class, file, library, interface, or the like) to which differencing analysis and/or reluctance can be applied. The granularity criteria may be user specified, according to some embodiments, through a user interface adjustable setting. The code generator 140 can identify semantic differences between the original code 110 and the new code 120 at the level of the specified granularity. For example, when the granularity criterion specifies statement-level comparisons, the code generator can identify semantic differences or equivalences between the original code 110 and the new code 120 at the statement level. Referring again to FIG. 5A, this level of granularity would correspond to identifying semantic equivalence between the statement "y=b+a+c;" in the old code 110 and the statement "y=c+b+a;" in the new code 120. As an example in such statement-level cases, when corresponding functions in the original code 110 and the new code 120 semantically differ by a single statement (e.g., statement v=sin(u) versus statement r=cos(u), which is the same as in the original model of FIG. 5B and the new model of FIG. 5C), the code generator 140 can include the changed statement from new code 120 in syntactical-change-resistant code 130, and preserve the structure and syntax of the remainder of the function from the original code 110 for which semantic equivalences have been found. In the example shown in FIG. 5A, the syntax "y=b+a+c;" is preserved in the change-resistant code 130.

As an additional example, when the granularity criterion specifies function-level comparisons, the code generator 140 may identify semantic differences between the original code 110 and the new code 120 at the function level or at a sub-function level (e.g., statement level). In this example, when corresponding functions in the original code 110 and the new code 120 semantically differ by one or more statements, the code generator 140 can include the entire function from new code 120 in syntactical-change-resistant code 130, thereby allowing in the syntactical-change-resistant code 130 non-semantic changes between original code 110 and new code 120 that might not be allowed if granularity were specified at the statement level.

In the example shown in FIGS. 5A-5D, when the granularity level is set to statement level, the syntactical-change-resistant code generation process produces the code 130 or the model of FIG. 5D. When the granularity level is set to function level, the syntactical-change-resistant code generation process can produce the code 120 and the new model of FIG. 5C as the syntactical-change-resistant code.

According to some embodiments, the code generator 140 can include and be configured to apply multiple granularity criteria, specific to different program components. The granularity criteria can reflect a balance between precision (e.g., the degree of unintentional, non-semantic difference between original code 110 and new code 120 permitted to be included in the syntactical-change-resistant code 130) and efficiency (e.g., the amount of time required to generate syntactical-change-resistant code 130). In some embodiments, an adjustable setting of the code generator 140 can specify one or more granularity criteria. In various embodiments, the granularity criteria can be specified in response to user inputs (e.g., by way of user interactions with a user interface), or configuration information obtained by the code generator from another device, program, or a memory accessible to the code generator. According to some implementations, a granularity criterion may be specified in one or more default settings of the code generator 140.

The level of granularity specified and/or the semantic differencing technique used may affect scalability of the change-resistant code generator 140 to large code bases. For example, a coarse level of granularity (e.g., class level) may allow the change-resistant code generator 140 to process large, complex code bases in reasonable amounts of time, but at lower precision and preservation of original code. A fine level of granularity (e.g., expression level) may preserve more original code, but may be practically unworkable for large code bases having tens of millions of lines of code. In some embodiments, when the syntactic change in the new code $C_N$ is very large, scalability of the change-resistant code generator 140 may be achieved by employing techniques such as abstract semantic difference via speculative correlation that offers soundness by using abstract interpretation with a pragmatic loss in precision.

Referring again to the example depicted in FIG. 5A, the code generator 140 may be configured to apply a statement-level granularity criterion. In this example, the code generator performs semantic differencing (act 620) and identifies the semantic equivalency between the expression "y=c+b+a;" in new code 120, and the expression "y=b+a+c;" in original code 110, as well as semantic equivalency between explicit declaration of register variable "r" in new code 120 and stack variable "v" in original code 110. Accordingly, the code generator 140 preserves (act 630) the control flow, expression "y=b+a+c;", and use of stack variable "v" used in original code 110, and includes these elements in syntactical change-resistant code 130, as shown in FIG. 5A, in spite of the structural and syntactic differences between the original code 110 and the new code 120. In this manner, the change-resistant code generator 140 can enhance algorithmic equivalence between the original code 110 and the new code 120 by carrying forward to syntactical change-resistant code 130 a majority of original code 110 that has been previously used and tested and known to work well. For example, the numerical result from "y=b+a+c;" may, in some program implementations, differ from the result for "y=c+b+a." Preserving the original syntactics and structure can preserve the original, tested numerical accuracy and improve code reliability.

Referring again to FIG. 6 together with the examples shown in FIGS. 5A-5G, based on the semantic equivalences and differences identified for the corresponding paths/slices of the original code 110 and new code 120, or of the original model and new model of FIGS. 5B and 5C, respectively, additional information for generating the change-resistant code 130 or model of FIG. 5D is derived. For example, by analyzing the semantic equivalence between y=v*v and y=r^2, a symbol mapping between v and r can be established. In another example, the structural differences are identified between semantically equivalent portions, during the semantic differencing process or later by additional analysis. In this example, the path 511's else path semantically corresponds to the path 512's if path. The derived information about syntax and structure relationships between corresponding slices that are semantically equivalent can be used in generating the change-resistant code or model in a later step. Alternatively or additionally, part or all of the additional information derived using the example methods described above can be obtained through existing analysis or additional analysis performed with the syntactical and structural equivalent portions of code. As explained previously, from z=f(y), it is possible to identify y=v*v and y=r*r as being semantically equivalent, and therefore, the symbol mapping between v and r can be established. Similarly, other syntax and structural relationships can be derived.

In some implementations, a change-resistant code generator 140 can perform symbol mapping as part of or in addition to semantic differencing (act 620). For example, the code generator can be configured to map present in the original code 110 slices to symbols used in slices of new code 120. The mapped symbols may be semantically equivalent or non-equivalent. For example and referring to FIG. 5A, a code generator 140 may identify that the symbol "v" in the original code 110 maps to the symbol "r" in the new code 120. The code generator 140 may be configured to preserve the use of the original symbols in the change-resistant code when possible.

A process 600 of syntactical change-resistant code generation may further include identifying (act 630) slices of the original code 110 and new code 120 that contain semantic differences. This step may comprise partitioning or identifying the original code 110 and the new code 120 into distinct program slices to which semantic differencing (act 620) may be applied. According to some implementations, a code generator 140 can be configured to identify program slices in new code 120 and original code 110. The identified program slices may comprise portions and/or sub-portions of original code 110 and new code 120 that are generally directed to discrete functionalities. For example, the identified program slices in original code 110 may support functionality present in original code 110 and absent in new code 120. Similarly, the identified program slices in new code 120 may support functionality present in new code 120 and absent in original code 110. Further, the identified program slices in original code 110 may support functionality present in original code 110 and there may be corresponding program slices identified in new code 120 that also support the same functionality in the original code 110. The program slices can be identified using slicing criteria including execution paths, data flow, data dependencies, and the like. In some implementations, a code generator 140 may identify the program slices using known methods like Weiser slicing, backward slicing, intraprocedural slicing, interface slicing methods, and barrier slicing methods, and abstract slicing. As explained previously, FIGS. 5E-5G show examples of slices created based on execution paths of code or models shown in FIGS. 5A-5D.

Weiser slicing and code integration methods such as backward slicing and intraprocedural slicing may be used to identify slices of the original code 110 that support functionality absent from new code 120. These slicing methods may identify slices of the original code 110 using execution paths identified during identification of semantic differences between original code 110 and new code 120.

Interface slicing methods may be used to address interface changes in program components, such as functions and modules. Such interface changes can include changes to function argument name, argument order, or the like. While changes in argument order may not affect semantics, preserving argument order between original code 110 and syntactical-change-resistant code 130 may be beneficial, as compilers may respond differently to differences in argument order. Preserving the original argument order can improve code reliability of the change-resistant code 130, since the original compiled code using the same argument order may have been proven to be reliable through extended use in the field. Preserving the original argument order can also avoid unneccesary and unpredictable risks associated with compiling and attempting to execute a new argument order.

Abstract slicing may be used when variable ranges may affect computation of program slices. Such abstract slicing may increase the precision of the generated slices (e.g., reducing the amount of unintentional, non-semantic changes present in syntactical-change-resistant code 130). Abstract slicing may be performed using the Polyspace abstract interpretation engine, or a similar tool. In some embodiments, given the computational requirements of abstract slicing, abstract slicing may be used to refine slices identified by other slicing methods.

Barrier slicing methods may also be used to identify program slices in the original code 110 and new code 120. Barrier slicing may limit a program slice to identifiable or identified barriers within the code. A barrier slice may be computed as a transitive backward closure of data and control dependencies, resulting in all the statements on which the criterion depends directly or indirectly with a further limitation that some statements within the code may be marked as barriers (e.g., they are uninteresting, the values of the involved variables in the marked statements are known, or the statements have been marked as protected). Barrier slices can be computed by stopping the computation of the transitive closure of the program dependencies when a barrier is reached. In another example, a portion of original code 110 or new code 120 can be associated with one or more barrier criteria. In some instances, the barrier criteria may specify a maximum number or ratio (e.g., 50% of lines or code blocks) or other amount of code changes permitted for a program component or portion (e.g., function, subsystem, module, etc.) of the code for which at least some sub-portions of original code 110 will be preserved or carried forward to syntactical change-resistant code 130. When this threshold number or ratio or amount is exceeded for the program component or portion, the code generator 140 may create a slice stubbing out (or commenting out) the entire component from the original code 110 and stubbing in an entire replacement component from the new code 120 into the syntactical change-resistant code 130. In some instances, the barrier criteria may specify a portion of the original code 110 or new code 120 as protected. For example, no semantic and syntactic changes may be permitted for that section. Accordingly, the code generator may be configured to avoid generating change-resistant code 130 that contains parts differing from the protected portion of the original code 110 or new code. For example, the change-resistant generator 140 may tag the protected portion to create barriers, and may stop the computation of transitive closure of the sliced program when the tagged barriers are reached.

An aspect of barrier slicing is that it can provide means of reducing change-reluctance of the change-resistant code generator 140 or increasing it to the limit of stopping the code-generation process with appropriate warnings and errors. For example, sections of the original code 110 or new code 120 can be tagged by barrier criteria (e.g., ratio of changes within a component or code portion, marked protected code, etc.). When the change-resistant code generator 140 detects changes for these sections, warnings can be issued to alert a user for example when changes, e.g., semantic, syntactical, and/or structural changes, are made to a portion of code marked as protected. The change-resistant code generator 140 may stop the computation of transitive closure of the program slices when the barriers are reached. A further aspect of barrier slicing is that it can permit a user, through a user interface, to reduce or increase the amount of original code 110 preserved in syntactical change-resistant code 130 (e.g., by setting barriers in the original code 110 or new code 120, by changing parameters associated with one or more barriers such as ratio of changes permitted within a program component or portion, etc.). In some implementations, the one or more slicing techniques described above can also be applied in steps 620 and/or 630 described above. In some cases, identifying slices (act 630) may occur before semantic differencing (act 620), or be intertwined (occur simultaneously) with acts of semantic differencing. Slicing techniques used in different steps of the methods, e.g., steps 620, 630, and/or 640 can be the same or different.

A process of syntactical change-resistant code generation 600 can further include generating syntactical, change-resistant code (act 640). The act of generating syntactical, change-resistant code (act 640) can include acts of stubbing in or preserving portions of original code 110 for which semantic equivalency has been found in corresponding portions of new code 120. For example and referring to FIG. 5A, the conditional "if" statement from the original code 110 is preserved or stubbed in to the change-resistant code 130. The act of generating syntactical, change-resistant code (act 640) can also include acts of stubbing in or preserving portions of new code 120 for which semantic differences have been found in comparison to the original code 110. For example and referring to FIG. 5A, the computation of the variable "v" in the new code 120 is preserved or stubbed in to the change-resistant code 130.

The act of generating syntactical, change-resistant code (act 640) can also include acts of symbol propagation as described above. As an example and referring again to FIG. 5A, a symbol (e.g., "v") from the original code 110 may be propagated into a semantically non-equivalent portion (e.g., "v=cos(u)) of the new code 130. Symbol propagation may occur by either propagating an old symbol from original code 110 into a semantically-changed new code portion, or by propagating a new symbol from new code 120 into an original code portion that is preserved or stubbed in to the change-resistant code 130. A decision on symbol propagation may be based on a change-reluctance level, such as whether the symbol is used locally or globally. In some cases, stubbing in or preserving original code portions may not require changing symbols that are naturally carried into the change-resistant code 130 with the preserved code portions. In some cases, the symbol back-propagation may be limited (e.g., by a user or user setting) to local declarations or files within the change-resistant code. In some cases, the symbol back-propagation may be global or extend across multiple code files. Additionally, the structure of the original code can be preserved. In the example shown in FIGS. 5A-5G, the change-resistant code generation process generates the change-resistant code with y=v*v, which can be a copy of the original code portion or a modified new code portion y=r^2. Such code generation preserves both the symbol v, and the structure of the y calculation. The result of this generation process can be seen in FIGS. 5A, 5D, and 5G.

In generating change-resistant code or model, the change-resistant code generation process, e.g., implemented by a coder, further generates code that correspond to the semantic different portions of the new code compared to the original code. In some implementations, a code generator 140 can be configured to change the syntax and/or structure of program slices from the new code 120 that are included in syntactical-change-resistant code 130, consistent with disclosed embodiments, e.g., based on the information generated based on analysis of the semantic equivalent code portions and/or analysis of the syntactical and structural equivalent code portions as explained previously. For example, the code generator can be configured to replace the variables present in the slices of new code 120 with the semantically equivalent mapped variables. In this manner, the code generator can preserve the syntax of original code 110, even in portions of code taken from new code 120. As an example and referring again to FIGS. 5A-5G, according to some embodiments a code generator 140 can identify the statements "v=sin(u)" and "r=cos(u)" as differing semantically and syntactically between original code 110 and new code 120. A code generator 140 performing program slicing can identify the semantic differences between original code 110 and new code 120 as limited to these statements. Thus, in this example the code generator 140 can create program slices for the two statements and stub out the statement "v=sin(u)" and stub in the statement "r=cos(u)". Furthermore, an example code generator 140 can identify the semantic equivalence of register variable "r" in new code 120 or model of FIG. 5C and stack variable "v" in original code 110 or model of FIG. 5B. Thus the code generator may not carry forward the register variable "r" and preserve or stub in the stack variable "v", to yield the slice "v=cos(u)" in syntactical-change-resistant code 130 or model of FIG. 5D. According to some embodiments, the stubbed in, as well as the stubbed out, program slices can be included in syntactical-change-resistant code 130, as shown in the right panel of FIG. 5A or model of FIG. 5D. Including the stubbed-out slices (which may also be referred to as "portions" or "sub-portions") of code near the stubbed-in slices can be useful for code review and debugging purposes. Additionally, in some implementations, the location of the program portion from the new code 120 (or model of FIG. 5C) representing the semantic changes compared to the original code 110 (or model of FIG. 5C) can be determined based on information about the structural differences or correspondences between program slices. For example, in the examples shown in FIGS. 5A-5G, original program portion v=sin(u) is within paths 1 and 2 of FIG. 5E (else branch), and new program portion r=cos(u) is within paths 1 and 2 of FIG. 5F (if branch). Because the structure of the original code is preserved, change-resistant code includes v=cos(u) in the else branch.

As a result, the code 110 and 130 or the models of FIGS. 5B and 5D are substantially the same in syntax and structure, and can offer the benefits previously described. Semantic difference between the new and old models or code is reflected in the change-resistant code or model, with minimal structural or syntactical changes to the original code or model. The similarities between the code 110 and 130, or between the models of FIGS. 5B and 5D can also be seen by comparing the execution paths of FIGS. 5E and 5G. The 3 paths in each figure are substantially the same as each other, syntactically and structurally. The semantic differences between the old and new code or models are reflected in the block of code that comments out v=sin(u) and adds in v=cos(u) as shown in FIGS. 5A, 5D, and 5G. The display of the difference can allow a user to readily understand the semantic changes.

In some cases, a change-resistant code generator 140 can be configured to preserve the syntax of the new code 120. For example, when a variable is local to a component of new code 120 and the component has been identified for including in syntactical-change-resistant code 130, the code generator may not replace the local variable with a semantically equivalent variable from original code 110.

In some embodiments, one or more default settings of the code generator may specify the application of slicing methods to original code 110 and new code 120. In various embodiments, the application of slicing methods can be specified in response to user inputs (e.g., by way of user interactions with a graphical user interface), or configuration information obtained by the code generator from another device, program, or a memory accessible to the code generator.

In some embodiments, one or more default settings of the code generator may specify whether to preserve the syntax of original code 110. In various embodiments, the option of replacing a variable in a slice of new code 120 with a semantically equivalent mapped variable from original code 110 can be specified in response to user inputs (e.g., by way of user interactions with a graphical user interface), or configuration information obtained by the code generator from another device, program, or a memory accessible to the code generator. When the code generator 140 determines whether to replace a variable in response to response to user inputs, this determination may be made during or after generation of the syntactical-change-resistant code 130. For example, the code generator may be configured to replace all variables in included slices of new code 120 that map to semantically equivalent variables in original code 110, then provide a user the opportunity to revert one or more of these replacements. Alternatively, the code generator may be configured to preserve all local variables in included slices of new code 120 that map to semantically equivalent variables in original code 110, then provide a user the opportunity to make one or more of these replacements. In some embodiments, the user may provide information regarding the replacements, or potential replacements. This information can indicate the variable to be replaced, the mapped semantically equivalent variable, frequencies and/or locations of use of the variable to be replaced and the mapped semantically equivalent variable, metadata associated with each variable, code snippets including each variable, and the like.

Generating 640 change-resistant code can include carrying forward slices, portions and/or sub-portions of original code 110 to syntactical change-resistant code 130 for which there is semantic equivalence with corresponding slices, portions and/or sub-portions of new code 120, but where structural and/or syntactic differences exist between the corresponding slices, portions and/or sub-portions. The generating 640 can include stubbing in slices, portions and/or sub-portions of new code 120 into the syntactical change-resistant code 130 identified by the code generator 140 to be absent or semantically different from slices, portions and/or sub-portions of original code 110. In some embodiments, the generating 640 can further include stubbing out or excluding (e.g., commenting out) from the syntactical change-resistant code 130 slices, portions and/or sub-portions of original code 110 identified by the code generator 140 to be absent or semantically different from slices, portions and/or sub-portions of new code 120. The stubbing out of, or excluding from the executable syntactical change-resistant code slices, portions and/or sub-portions of original code 110 can remove functionality present in the original code 110, but not present in the new code 120. According to some implementations, the generating 640 can further comprise including commented-out, stubbed-out slices, portions and/or sub-portions of original code 110 in the syntactical-change-resistant code 130 as reference code for the aid of a user or code developer and/or for traceability purposes. As explained previously, in many situations, stubbing-in or stubbing-out code can involve using portions of the original code or new code, or generating code that corresponds to the corresponding portions of the original code or new code. In addition, when portions of new code is to be stubbed in or code corresponding to such portions are generated, the portions of the new code may need modifications, e.g., symbol changes or structural changes. The stubbing in process also identifies the proper locations for including the portions of the new code or for the generated code, as explained previously.

According to some embodiments, a change-resistant code generator 140 may perform acts of determining whether or not to use portions of original code 110 in change-resistant code 130 when generating 640 change-resistant code. A determination may be based on a difference criterion, such as a ratio of changed code versus total lines of code within a program component, or the like. For example, if a small fraction of code is changed for a code portion, a difference criteria may be satisfied and the change-resistant code generator may act to preserve original code portions 110. A difference criteria may be expressed as a percentage or fractional value of changed code (e.g., less than 50%, or less than any value selected from 0% to 75%). A "reluctance" aspect of the change-resistant code generator 140 (described above) will resist implementing the proposed syntactic and/or structural change(s) in the new code $C_N$ 120 and will instead implement its equivalent code (or related IR) from the original code $C_O$ 110, as depicted in FIG. 5A through FIG. 5G, for example. If a large fraction of code is change, then a difference criterion may not be satisfied and the change-resistant code generator may be configured to not preserve original code portions 110.

Change-resistant code-generation process 600 may also include deprecating (act 650) obsolete code. Obsolete code (e.g., code portions from the original code 110) may be deprecated by commenting out or exclusion from the change-resistant code 130. For example, functionalities that do not exist in new code 120 and exist in the old code may not be present or active in the change-resistant code 130.

Variations of the process of change-resistant code generation 600 are possible. In the above description, emphasis is placed on original code 110 and new code 120 to simplify the explanation. Accordingly, the original code 110 is compared against the new code 120 to identify structural, syntactic, and semantic differences. In some implementations, a change-resistant code generator 140 may also receive as input a new model 121 in addition to the new code 120 and determine structural, syntactic, and semantic differences based at least in part on information from the new model 121. The information from the new model may include knowledge or information about how code is generated from the new model.

In some implementations, a change-resistant code generator 140 may receive as input the original code 110 and only new model 121. The code generator may determine structural, syntactic, and semantic differences based on information from the new model 121. The information from the new model may include knowledge or information about how code is generated from the new model. In some cases, the code generator 140 may generate new code 120 from the new model 121 and compare the original code 110 with the generated new code according to the described embodiments. The code generator 140 may generate change-resistant code 130 at least in part in accordance with the above-described embodiments in connection with FIG. 6.

In some implementations, a change-resistant code generator 140 may receive as input the original code 110, an original model 111, new code 120, and a new model 121. The code generator may determine structural, syntactic, and semantic differences based on information from both the received codes and received models. The information from the models may include knowledge or information about how code is generated from the model. Such information may include aspects of code optimizations. The code generator 140 may generate change-resistant code 130 at least in part in accordance with the above-described embodiments in connection with FIG. 6.

In some implementations, a change-resistant code generator 140 may receive as input only the original model 111 and new model 121. In some cases, the code generator may determine structural, syntactic, and semantic differences based on information from the models. The information from the models may include knowledge or information about how code is generated from the models. In some cases, the code generator 140 may generate original code 110 from the original model 111, generate new code 120 from the new model 121, and compare the original code 110 with the generated new code 120 according to the described embodiments. The code generator 140 may generate change-resistant code 130 at least in part in accordance with the above-described embodiments in connection with FIG. 6.

In some implementations, an alternative process of change-resistant code generation may comprise generating functional equivalent representations of the original code 110 ($C_O$) and/or original model 111 ($M_O$) and of the new code 120 ($C_N$) and/or new model 121 ($M_N$) by a change-resistant code generator 140 and comparing the functional equivalent representations. For example, from the original code $C_O$ and new code $C_N$, corresponding functional equivalent representations $F_O$, $F_N$ can produce by the change-resistant code generator 140. Various methodologies may be employed to generate these functional equivalent representations. Such methodologies include, but are not limited to technology available inside Simulink® Code Inspector to parse and analyze ANSI compliant C/C++ code and convert them into a suitable internal form such as static single assignment (SSA), and technology inside Polyspace® capable of parsing and transforming C/C++ code into an abstracted form suitable for formal analysis including use of abstract interpretation. As a result, the following functional equivalent representations can be created by the change-resistant code generator 140: $C_O \rightarrow F_O$ and $C_N \rightarrow F_N$.

A change-resistant functional representation can be derived from the original functional representation $F_O$ and new functional representation $F_N$ symbolically as follows:

$$F_{CR} = F_O + \Delta F_N - \Delta F_O$$

where $\Delta F_N$ is the functionality in $F_N$ that is not in $F_O$; and $\Delta F_O$ is the functionality in $F_O$ that is strictly not in $F_N$. In other words, $(+\Delta F_N)$ is the functional representation of completely new behavior in $F_N$ to be added to $C_{CR}$. And $(-\Delta F_O)$ is the functional representation of existing behavior in $C_O$ that needs to be replaced or completely removed from $C_{CR}$.

In some embodiments, $\Delta F_N$ and $\Delta F_O$ can be calculated by the change-resistant code generator 140 by leveraging some of the internal technology and techniques inside Simulink® Code Inspector providing graph-theoretical, bi-directional traceability to $C_N$ and $C_O$, respectively. In other words, through various graph-theoretical techniques the change-resistant code generator 140 can perform equivalency analysis between two code bases $C_O$ and $C_N$ to detect the "canonical" functional differences between $C_N$ and $C_O$. This information can then be used to stub-out deprecated code (e.g., $C_O-\Delta F_O=C_{O-\Delta O}$). That is, portions of code in CO that represent $\Delta F_O$ can be excluded to transform $C_O$ to $C_{O-\Delta O}$ by stubbing-out the code in $C_O$ representing $\Delta F_O$. This can be achieved, for example, by commenting-out code in $C_O$ responsible for deprecated behavior $\Delta F_O$, or by using functionally equivalent methodologies such as instrumenting language specific code variants (e.g. using C/C++ #if #else and macros).

The information from graph-theoretical analysis can also be used to stub-in needed code (e.g., $C_{O-\Delta O}+\Delta F_N=C_{CR}$). The stubbing in of code portions can comprise determining the portions of new code $C_N$ that correspond to the added functionalities $\Delta F_N$. This can involve identifying, partitioning, and extracting slices of code from $C_N$ that represent the behavior $\Delta F_N$, identifying corresponding stubbing-in locations in $C_{O-\Delta O}$. As described above, the change-resistant code generator 140 may establish (by a default setting or user setting the granularity of stubbing-in code corresponding to $\Delta F_N$. The granularity can be any combination file, library, function, or even expression levels. In some implementations, at each location of stubbing-in, depending on user selective options or granularity of specific behavior within $\Delta F_N$, the stubbing method can be in-lined full instrumentation of the code, or a call-out instrumentation to stubbing in code created separately from $\Delta F_N$. It may be appreciated that there can be two basic classes of stubbing-in partitioned behavior within $\Delta F_N$: strictly new behavior that is stubbed-in by one or more above mentioned means and replacement behavior that combines stubbing-out old behavior and then stubbing-in new behavior. According to some embodiments, various methods of stubbing-in and stubbing-out can be used. For example, techniques deployed for code-coverage instrumentation technology in Simulink® Design Verifier and Polyspace®, as well as code variants generation techniques used in Embedded Coder®. As described above, analysis of functionally equivalent portions of code may be performed to maintain symbol consistency or structural consistency.

Aspects of the invention include associations that can link slices, portions, and/or sub-portions of the original code 110 (and/or original model 111) with corresponding slices, portions, and/or sub-portions in the change-resistant code 130 (and/or change-resistant model 131) and/or new code 120 (and/or new model 121). The links can facilitate users' model design process, development process, testing process, etc., and provide user with confidence or comprehension of the code and model relationships. The invention can further include associations that can link slices, portions, and/or sub-portions of the new code 120 (and/or new model 121) with corresponding slices, portions, and/or sub-portions in the change-resistant code 130 (and/or change-resistant model 131). For example, features such as reports, useful inline comments, and such can be automatically created to assist with qualification plans, certification processes, and auditing. Association information can be used to automatically generate code reports (including bi-directional navigation reports) that can identify evolution of the change-resistant code 130 and/or model 131. According to some embodiments, the associations may be implemented by tagging slices, portions, and/or sub-portions of code during the change-resistant code-generation process 600. For example, tags may be added to slices of original code 110 and new code 120 found to be semantically different. When the semantically-different slice of new code 120 is stubbed into the change-resistant code 130, the tags may provide a navigational aid to the corresponding portion of original code 110 that has been replaced. As such, a user may be able to quickly navigate back-and-forth to corresponding slices, portions and/or sub-portions of code that have been modified. Tags may also be implemented between code and a corresponding model from which the code is generated, so that associations can be extended to a model portion from which the slice, portion and/or sub-portion of code was generated. In some implementations, tags may also be implemented in intermediate representation layers so that associations can be extended to intermediate representation layers.

Associations according to the described embodiments can benefit users or developers of change-resistant code 130. For example, such associations can allow users to readily identify respective change-resistant code portions that result from updated portions of a new model 121, or how changes between an original model 111 and new model 121 affect change-resistant code 130. This can assist in design and development of code, e.g., provide confidence or ease of modifying model and/or code designs, etc. In some implementations, associations can also include the information regarding differences identified between slices, portions, and/or sub-portions of a new code 120 and original code 110, and not merely which part of original code is stubbed out and which part of new code 120 is added. Instead, corresponding functionalities can be identified and the stubbed in/out portions can be paired to show the user meaningful differences between the code. For example and referring again to FIG. 5A, v=sin(u) can be paired with v=cos(u) (e.g., located next to or otherwise visually linked to the replacement code portion in the change-resistant code 130), because they correspond semantically to each other (e.g., were identified to be semantically different during semantic differencing (act 620)). As such, the user or developer can benefit from reviewing the context in which the statement is made.

Figure 7:
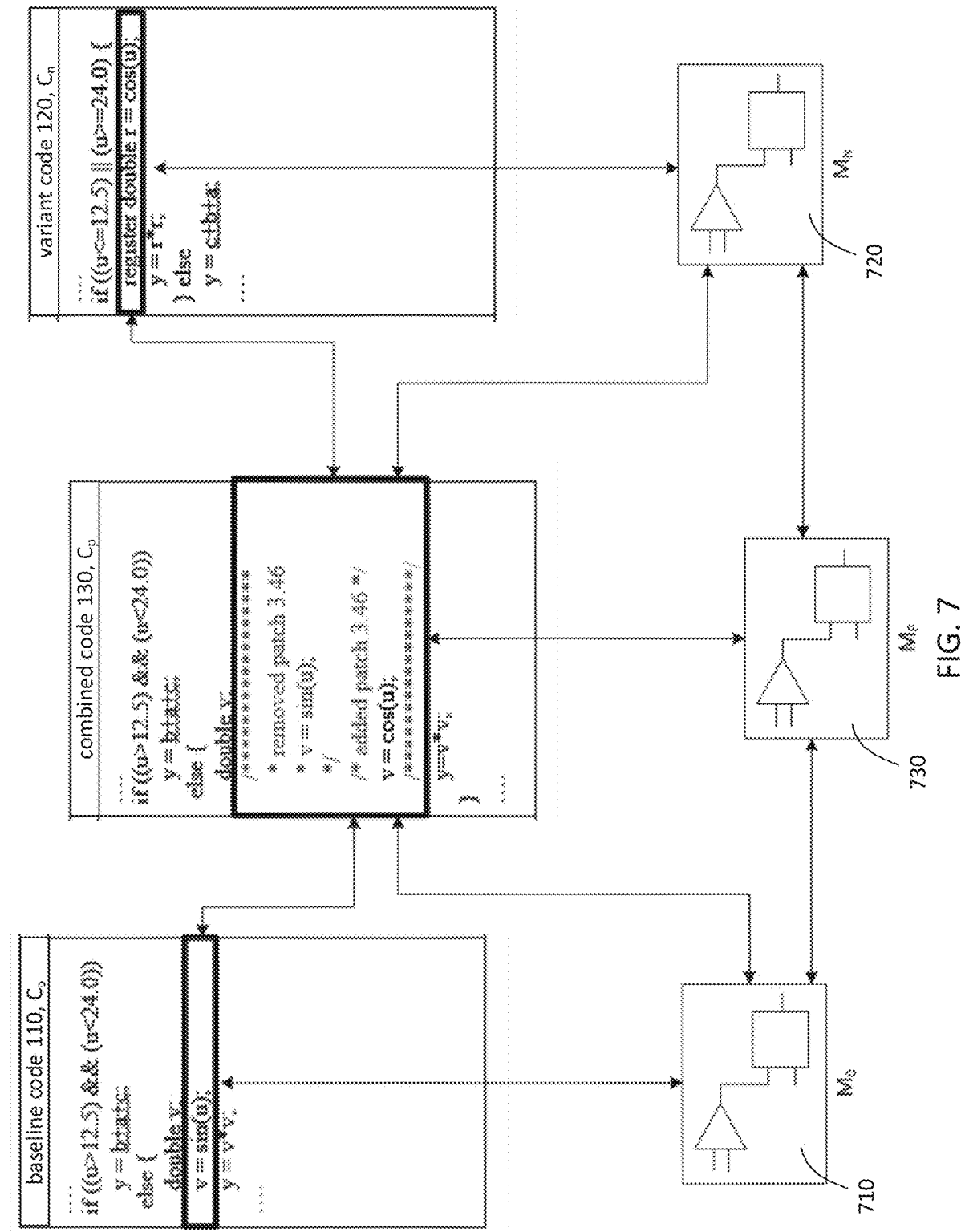
FIG. 7 depicts an example schematic illustrating traceability between the inputs and outputs of the process of FIG. 6.

FIG. 7 depicts an example schematic illustrating associations that can be made for original code modifications. According to some embodiments, associations for modifications to original code 110 can be manifested in a technical computing environment as an ability to obtain, for example, a traceability report or other graphical display that identifies links or associations between slices, portions or sub-portions of syntactical-change-resistant code 130 and a source or sources of the portions or sub-portions of the code 130. In some implementations, association information can be included within the syntactical-change-resistant code 130 (e.g., included within commented-out sections of code as illustrated in the syntactical change-resistant code 130 of FIG. 7).

According to some embodiments, a source of a slice, portion or sub-portion of syntactical-change-resistant code 130 may be a portion or sub-portion of original code 110 and/or original model 111, a portion or sub-portion of new code 120 and/or new model 121, or a combination of portions and/or sub-portions of original code 110 and new code 120 and their respective models. According to some embodiments, a source of a portion or sub-portion of syntactical-change-resistant code 130 may be an original model 710 used to produce original code 110, a new model 720 used to produce new code 120, a change-resistant model 730 used to produce syntactical-change-resistant code 130, or some combination of these models. In some cases, a source of a portion or sub-portion of syntactical-change-resistant code 130 may be some combination of original code 110 and/or new code 120 and one or more models 710, 720, 730. Additionally or alternatively, a source of a portion or sub-portion of syntactical-change-resistant code 130 may be a graphical model, one or more optimization rules, model configuration options, etc.

According to some embodiments, associations between portions or sub-portions of syntactical-change-resistant code 130 and a source or sources of the portions or sub-portions of the code 130 may be implemented using tags, pointers, comments, etc. For example, a first tag may be associated with a graphical affordance of a model (e.g., original model 710, new model 720, or change-resistant model 730) that is used to generate a code portion or sub-portion from the graphical affordance. A same tag may be associated with the generated code portion or sub-portion and thereby provide a link between the model and code portion or sub-portion. As another example, one or more pointers may be associated with a portion or sub-portion of syntactical change-resistant code that point(s) to a location or locations in memory at which a source or sources of the portion or sub-portion of code can be found and retrieved for rendering on a display for a user or code developer. The one or more pointers can then provide a link between the portion or sub-portion of code and its source. According to some embodiments, the tags or pointers may be unique for each linked pair of code and source. In some implementations, three same tags or two pointers may be used to link a portion or sub-portion of syntactical change-resistant code 130 with a portion or sub-portion of new code 120 or original code 110 and with a graphical affordance or other component of a model 710 or 720. In some implementations, a tag or pointer may be used to link a portion or sub-portion of syntactical change-resistant code 130 with one or more optimization rules used, in part, to produce the syntactical change-resistant code 130. In some implementations, a tag or pointer may be used to link a portion or sub-portion of syntactical change-resistant code 130 with a portion or sub-portion of an intermediate representation for any of the original code 110, new code 120, or change-resistant code. Association information can be used for visually rendering information relevant to changes implemented in the change-resistant code 130 and/or change-resistant model 131. In some implementations, the link information among different entities, e.g., various code and code portions, or various models and model portions, can be provided on the entities or in one or more reports. The link information may be textual (e.g., descriptions) or graphical (e.g., highlighting by colors, flash actions, etc.). In some implementations, the link information can be encoded in hyperlinks for a user to switch between the linked entities.

A further aspect of the invention is that testing of the change-resistant code 130 can be reduced in complexity and time compared to testing that would be performed on new code 120. For example, code slices carried forward from the original code 110 may not need testing if they are unaffected by functionality and data flow of code slices stubbed in from new code 120. $F_O$ r large code bases where few updates are made, a substantial portion of the change-resistant code 130 may not need testing. Instead, testing of the change-resistant code 130 may be limited to stubbed-in slices from the new code 120 and slices of the change-resistant code 130 affected by the stubbed-in slices from the new code 120. Such reduced testing can save a substantial amount of time and cost in qualifying the change-resistant code 130. In some implementations, test cases for the original code 110 may be reused.

CONCLUSION

Systems and/or methods for syntactical change-resistant code generation described herein may be implemented in various configurations and processes as described in this section.

As used in the entire disclosure, code can be graphical or textual code, or a combination thereof. Code can also be models (e.g., executable models), consistent with the content of the disclosure, even though at particular parts of the descriptions, code and model are described separately.

Additionally, in generating the change-resistant code, the code generation process can generate code based on the analyses (e.g., syntactical and/or structural and/or semantic differencing or equivalence analysis, etc.) described previously, e.g., by using, e.g., copying and/or modifying (or preserving, stubbing-in, stubbing-out, etc.), one or more portions of the original code and the new code, and/or their respective intermediate representations, or by generating code from scratch, e.g., from the new model, using the information derived from the analysis, or by generating code from an intermediate presentation that leads to the new code using the information from the analysis. As explained above, although terminologies like preserving, stubbing-in, stubbing-out, propagation, etc. are used in the description, these terminologies do not limit the particular methods for generating the change resistant code, but instead, are meant to illustrate what the change resistant code contains relative to the new code and the original code.

Furthermore, analysis on differences, e.g., syntactical or structural or semantic can be equivalently called analysis on equivalences.

(1) A computer-implemented method comprising: receiving, by one or more processors, first code and second code, where the second code is an updated version of the first code; and generating, by the one or more processors, third code that is semantically equivalent to the second code. The generating can comprise acts of identifying, by the one or more processors, a first portion of the second code that is syntactically and structurally equivalent to a first portion of the first code, and a second portion of the second code that is syntactically or structurally different from a second portion of the first code, identifying, by the one or more processors, within the second portion of the second code, a first sub-portion that is semantically different from a first sub-portion of the second portion of the first code, the first sub-portions of the first and second code being syntactically or structurally different. The method may further comprise acts of identifying, by the one or more processors, within the second portion of the second code, a second sub-portion that is semantically equivalent to a second sub-portion of the second portion of the first code, the second sub-portions of the first and second code being syntactically or structurally different; including, by the one or more processors, the second sub-portion of the first code in the third code;

partitioning, by the one or more processors, the first sub-portion of the second code into multiple partitions, the partitioning being based on including the second sub-portion of the first code in the third code; and including, by the one or more processors, the multiple partitions of the first sub-portion of the second code in the third code at one or more locations within the third code.

(2) A system comprising: at least one processor; and at least one nontransitory computer-readable medium containing instructions that, when executed by the at least one processor, cause the system to perform operations comprising: receiving first code and second code, where the second code is an updated version of the first code; and generating third code that is semantically equivalent to the second code, the generating comprising: identifying a first portion of the second code that is syntactically and structurally equivalent to a first portion of the first code, and a second portion of the second code that is syntactically or structurally different from a second portion of the first code, identifying within the second portion of the second code, a first sub-portion that is semantically different from a first sub-portion of the second portion of the first code, the first sub-portions of the first and second code being syntactically or structurally different, identifying within the second portion of the second code, a second sub-portion that is semantically equivalent to a second sub-portion of the second portion of the first code, the second sub-portions of the first and second code being syntactically or structurally different; including the second sub-portion of the first code in the third code; partitioning the first sub-portion of the second code into multiple partitions, the partitioning being based on including the second sub-portion of the first code in the third code; and including the multiple partitions of the first sub-portion of the second code in the third code at one or more locations within the third code.

(3) A non-transitory computer readable medium, comprising:
instructions that, when executed by at least one processor, cause a system to perform operations comprising: receiving first code and second code, where the second code is an updated version of the first code; and generating third code that is semantically equivalent to the second code, the generating comprising: identifying a first portion of the second code that is syntactically and structurally equivalent to a first portion of the first code, and a second portion of the second code that is syntactically or structurally different from a second portion of the first code, identifying within the second portion of the second code, a first sub-portion that is semantically different from a first sub-portion of the second portion of the first code, the first sub-portions of the first and second code being syntactically or structurally different, identifying within the second portion of the second code, a second sub-portion that is semantically equivalent to a second sub-portion of the second portion of the first code, the second sub-portions of the first and second code being syntactically or structurally different; including the second sub-portion of the first code in the third code; partitioning the first sub-portion of the second code into multiple partitions, the partitioning being based on including the second sub-portion of the first code in the third code; and including the multiple partitions of the first sub-portion of the second code in the third code at one or more locations within the third code.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
receiving, by one or more processors, first code and second code, where the second code is an updated version of the first code; and
generating, by the one or more processors, third code that is semantically equivalent, at least in part, to the second code, the generating comprising:
identifying, by the one or more processors, a first portion of the second code that is syntactically and structurally equivalent to a first portion of the first code, and a second portion of the second code that is syntactically or structurally different from a second portion of the first code;
identifying, by the one or more processors, within the second portion of the second code, a first sub-portion that is semantically different from a first sub-portion of the second portion of the first code, the first sub-portions of the first and second code being syntactically or structurally different;
identifying, by the one or more processors, within the second portion of the second code, a second sub-portion that is semantically equivalent to a second sub-portion of the second portion of the first code, the second sub-portions of the first and second code being syntactically or structurally different;
generating the third code, by the one or more processors, that includes the second sub-portion of the first code in the third code;
analyzing A. the second sub-portions of the second portion of the first and second code or B. the first portions of the first and second code to derive information about syntactic changes and/or structural changes between the second sub-portions, and generating the third code, by the one or more processors, that includes one or more portions of the first sub-portion of the second code in the third code at one or more locations within the third code based on the information derived.

2. The method of claim 1, wherein the derived information identifies that a first symbol used in the first code maps to a second symbol used in the second code that is different from the first symbol and that can be replaced by the first symbol.

3. The method of claim 1, further comprising analyzing the first portion of the first code and the first portion of the second code to identify a first slice in the first code that corresponds to a first slice in the second code for which semantic differencing analysis can be performed.

4. The method of claim 3, wherein identifying the first slice is based on data dependencies.

5. The method of claim 3, wherein a slice is an expression, a function, a procedure, a method, a class, a file, a library, or an interface.

6. The method of claim 1, further comprising partitioning, by the one or more processors, the first sub-portion of the second code into multiple slices, the partitioning being based on including the second sub-portion of the first code in the third code, wherein the partitioning comprises analyzing any one or a combination of the following: execution paths of at least the second code, data dependencies within at least the second code, data flow within at least the second code.

7. The method of claim 6, wherein barrier criteria are associated with at least some of the first sub-portion of the second code and slicing criteria are identified using barrier slicing based on the barrier criteria.

8. The method of claim 1, further comprising:
including the first sub-portion of the second code in the third code; and
not including the first sub-portion of the first code in the third code as active code.

9. The method of claim 8, further comprising:
establishing an association between the first sub-portion of the second code in the third code and the first sub-portion of the first code; and
in response to user input, using the established association to visually render at least a portion of the first sub-portion of the first code for comparison with at least a portion of the first sub-portion of the second code.

10. The method of claim 1, wherein the second code comprises textual code, graphical code, or a combination of textual and graphical code.

11. The method of claim 1, wherein the first code is textual code and the second code is textual code or a graphical model from which textual code can be generated.

12. The method of claim 1, further comprising:
receiving, by the one or more processors, a first model corresponding to the first code and a second model corresponding to the second code; and
generating a third model that corresponds to the third code.

13. The method of claim 1, wherein the first code is a first graphical model and the second code is a second graphical model and the third code is a graphical model and/or textual code.

14. The method of claim 1, further comprising:
determining a measure of syntactic change exceeds a threshold value; and
in response to the determination, using abstract semantic difference via speculative correlation to identify within the second portion of the second code, the first sub-portion that is semantically different from the first sub-portion of the second portion of the first code.

15. The method of claim 1, wherein identifying the first sub-portion to be semantically different comprises abstract semantic differencing, semantic-graph differencing, and/or symbolic differencing.

16. The method of claim 1, further comprising, in response to identifying the second sub-portion of the second code:
providing instructions to display in a graphical user interface an indication to select at least one of the second sub-portion of the first code or the second sub-portion of the second code to include in the third code;
receiving a selection of the second sub-portion of the second code to include in the third code; and
including the second sub-portion of the second code in the third code.

17. The method of claim 1, further comprising establishing at least one association between a portion of the third code and a corresponding: portion of the first sub-portion of the second code, portion of a model used to generate the second code, or portion of a model corresponding to the third code.

18. The method of claim 1, further comprising establishing at least one association between a portion of the third code and a corresponding: first portion of the first code, first sub-portion of the first code, second sub-portion of the first code, or portion of a model used to generate the first code.

19. The method of claim 1, wherein generating the third code comprises:
copying, by the one or more processors, at least a portion of the second code that includes the first portion of the second code to create the third code; and
excluding, by the one or more processors, the second sub-portion of the second code from the third code.

20. The method of claim 1, further comprising:
receiving, by one or more processors, a first model and a second model, where the second model is an updated version of the first model;
generating the first code from the first model;
generating the second code from the second model.

21. A system comprising:
at least one processor; and
at least one non-transitory computer-readable medium containing instructions that, when executed by the at least one processor, cause the system to perform operations comprising:
receiving first code and second code, where the second code is an updated version of the first code; and
generating third code that is semantically equivalent to the second code, the generating comprising:
identifying a first portion of the second code that is syntactically and structurally equivalent to a first portion of the first code, and a second portion of the second code that is syntactically or structurally different from a second portion of the first code;
identifying within the second portion of the second code, a first sub-portion that is semantically different from a first sub-portion of the second portion of the first code, the first sub-portions of the first and second code being syntactically or structurally different;

identifying within the second portion of the second code, a second sub-portion that is semantically equivalent to a second sub-portion of the second portion of the first code, the second sub-portions of the first and second code being syntactically or structurally different;

including the second sub-portion of the first code in the third code;

partitioning the first sub-portion of the second code into multiple slices, the partitioning being based on including the second sub-portion of the first code in the third code; and including the multiple slices of the first sub-portion of the second code in the third code at one or more locations within the third code.

22. A non-transitory computer readable medium, comprising:

instructions that, when executed by at least one processor, cause a system to perform operations comprising:

receiving first code and second code, where the second code is an updated version of the first code; and generating third code that is semantically equivalent to the second code, the generating comprising:

identifying a first portion of the second code that is syntactically and structurally equivalent to a first portion of the first code, and a second portion of the second code that is syntactically or structurally different from a second portion of the first code;

identifying within the second portion of the second code, a first sub-portion that is semantically different from a first sub-portion of the second portion of the first code, the first sub-portions of the first and second code being syntactically or structurally different;

identifying within the second portion of the second code, a second sub-portion that is semantically equivalent to a second sub-portion of the second portion of the first code, the second sub-portions of the first and second code being syntactically or structurally different;

including the second sub-portion of the first code in the third code;

partitioning the first sub-portion of the second code into multiple slices, the partitioning being based on including the second sub-portion of the first code in the third code; and including the multiple slices of the first sub-portion of the second code in the third code at one or more locations within the third code.

23. A computer-implemented method comprising:

receiving, by one or more processors, first code and second code, where the second code is an updated version of the first code; and generating, by the one or more processors, third code that is semantically equivalent, at least in part, to the second code, the generating comprising:

identifying, by the one or more processors, a first portion of the second code that contains one or both of syntactic and structural differences from a first portion of the first code;

identifying, by the one or more processors, within the first portion of the second code, a first sub-portion that is semantically different from a first sub-portion of the first portion of the first code;

identifying, by the one or more processors, within the first portion of the second code, a second sub-portion that is semantically equivalent to a second sub-portion of the first portion of the first code, the second sub-portions of the first and second code being syntactically or structurally different;

partitioning, by the one or more processors, the first sub-portion of the second code into one or more slices;

including, by the one or more processors, the second sub-portion of the first code in the third code; and including, by the one or more processors, the one or more slices of the first sub-portion of the second code in the third code.

* * * * *